US012240147B2

(12) United States Patent
Datema et al.

(10) Patent No.: US 12,240,147 B2
(45) Date of Patent: *Mar. 4, 2025

(54) CONCRETE DRUM CONTROL, PROPERTY PREDICTION, AND MONITORING SYSTEMS AND METHODS

(71) Applicant: Oshkosh Corporation, Oshkosh, WI (US)

(72) Inventors: Bryan S. Datema, Rochester, MN (US); Christopher K. Yakes, Oshkosh, WI (US); Cody Clifton, Oshkosh, WI (US); Zhenyi Wei, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,774

(22) Filed: Oct. 2, 2023

(65) Prior Publication Data

US 2024/0025078 A1 Jan. 25, 2024

Related U.S. Application Data

(63) Continuation of application No. 17/462,621, filed on Aug. 31, 2021, now Pat. No. 11,806,896, which is a
(Continued)

(51) Int. Cl.
*B28C 5/00* (2006.01)
*B28C 5/42* (2006.01)
(Continued)

(52) U.S. Cl.
CPC ............ *B28C 5/422* (2013.01); *B28C 5/4217* (2013.01); *B28C 7/022* (2013.01); *B60P 3/16* (2013.01);
(Continued)

(58) Field of Classification Search
CPC ....... B28C 7/022; B28C 5/4217; B28C 5/422; B60P 3/16; G06Q 10/04; G06Q 10/06315; G06Q 50/08
See application file for complete search history.

(56) References Cited

U.S. PATENT DOCUMENTS 1,781,965 A 11/1930 Ball
1,862,999 A 6/1932 Ball
(Continued)

FOREIGN PATENT DOCUMENTS

CH 418942 A 8/1966
EP 1 654 101 A2 5/2006
(Continued)

OTHER PUBLICATIONS

International Search Report, PCT/US2017/037943, Nov. 24, 2017, 9 pages.

*Primary Examiner* — Anshu Bhatia
(74) *Attorney, Agent, or Firm* — Foley & Lardner LLP

(57) ABSTRACT

A drum control system includes one or more processing circuits having programed instructions to control a drum assembly to rotate a drum at a first, unmixed speed to mix drum contents received by the drum where the drum contents including ingredients of a concrete mixture, acquire drum contents data indicative of a property of the drum contents from a mixture sensor and monitor the property of the drum contents as the drum rotates, acquire a target property for the drum contents upon delivery, determine a second, mixed speed based at least partially on the target property, and control the drum assembly to rotate the drum at the second, mixed speed in response to determining that the property of the drum contents indicates that the ingredients have been sufficiently mixed.

20 Claims, 11 Drawing Sheets

Related U.S. Application Data continuation of application No. 16/522,453, filed on Jul. 25, 2019, now Pat. No. 11,413,787, which is a continuation of application No. 15/624,900, filed on Jun. 16, 2017, now Pat. No. 10,414,067.

(60) Provisional application No. 62/414,527, filed on Oct. 28, 2016, provisional application No. 62/406,390, filed on Oct. 10, 2016, provisional application No. 62/351,891, filed on Jun. 17, 2016.

(51) Int. Cl.
*B28C 7/02* (2006.01)
*B60P 3/16* (2006.01)
*G05D 13/00* (2006.01)
*G06Q 10/04* (2023.01)
*G06Q 10/0631* (2023.01)
*G06Q 50/08* (2012.01)

(52) U.S. Cl.
CPC ............ *G05D 13/00* (2013.01); *G06Q 10/04* (2013.01); *G06Q 10/06315* (2013.01); *G06Q 50/08* (2013.01)

(56) References Cited

U.S. PATENT DOCUMENTS

| | | |
|---|---|---|
| 2,285,685 A | 6/1942 | Shafer |
| 2,507,852 A | 5/1950 | Case |
| 2,676,003 A | 4/1954 | Oury |
| 3,773,304 A | 11/1973 | Hodgson |
| 3,948,493 A | 4/1976 | Moser et al. |
| 4,056,260 A | 11/1977 | David |
| 4,154,534 A | 5/1979 | Lawrence et al. |
| 5,067,740 A | 11/1991 | Christenson |
| 5,087,493 A | 2/1992 | Wang |
| 5,490,928 A | 2/1996 | Tanii |
| 5,538,274 A | 7/1996 | Schmitz et al. |
| 5,820,150 A | 10/1998 | Archer et al. |
| 6,036,352 A | 3/2000 | Sakamoto |
| 6,105,984 A | 8/2000 | Schmitz et al. |
| 6,267,494 B1 | 7/2001 | Burch |
| 6,286,987 B1 * | 9/2001 | Goode ................. B28C 5/4206 123/352 |
| 6,421,593 B1 | 7/2002 | Kempen et al. |
| 6,516,914 B1 | 2/2003 | Andersen et al. |
| 6,520,494 B1 | 2/2003 | Andersen et al. |
| 6,553,290 B1 | 4/2003 | Pillar |
| 6,561,718 B1 | 5/2003 | Archer et al. |
| 6,611,755 B1 | 8/2003 | Coffee et al. |
| 6,757,597 B2 | 6/2004 | Yakes et al. |
| 6,764,085 B1 | 7/2004 | Anderson |
| 6,860,332 B1 | 3/2005 | Archer et al. |
| 6,882,917 B2 | 4/2005 | Pillar et al. |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,976,688 B2 | 12/2005 | Archer et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,073,847 B2 | 7/2006 | Morrow et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,234,534 B2 | 6/2007 | Froland et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,489,993 B2 | 2/2009 | Coffee et al. |
| 7,520,354 B2 | 4/2009 | Morrow et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,756,621 B2 | 7/2010 | Pillar et al. |
| 7,784,554 B2 | 8/2010 | Grady et al. |
| 7,784,995 B2 | 8/2010 | Khouri et al. |
| 7,792,618 B2 | 9/2010 | Quigley et al. |
| 7,792,949 B2 | 9/2010 | Tewari et al. |
| 7,802,914 B2 | 9/2010 | Khouri |
| 7,835,838 B2 | 11/2010 | Pillar et al. |
| 7,848,857 B2 | 12/2010 | Nasr et al. |
| 7,850,364 B2 | 12/2010 | Harris et al. |
| 7,874,373 B2 | 1/2011 | Morrow et al. |
| 7,878,750 B2 | 2/2011 | Zhou et al. |
| 7,931,103 B2 | 4/2011 | Morrow et al. |
| 7,931,397 B2 | 4/2011 | Lindblom et al. |
| 8,000,850 B2 | 8/2011 | Nasr et al. |
| 8,095,247 B2 | 1/2012 | Pillar et al. |
| 8,337,352 B2 | 12/2012 | Morrow et al. |
| 8,534,403 B2 | 9/2013 | Pursifull |
| 8,561,735 B2 | 10/2013 | Morrow et al. |
| 8,727,604 B2 | 5/2014 | Compton et al. |
| 8,764,272 B2 | 7/2014 | Hazrati et al. |
| 8,864,613 B2 | 10/2014 | Morrow et al. |
| 10,414,067 B2 | 9/2019 | Datema et al. |
| 11,413,787 B2 | 8/2022 | Datema et al. |
| 2002/0015354 A1 | 2/2002 | Buckelew |
| 2002/0032517 A1 | 3/2002 | Buckelew et al. |
| 2003/0158635 A1 | 8/2003 | Pillar et al. |
| 2003/0195680 A1 | 10/2003 | Pillar |
| 2004/0133319 A1 | 7/2004 | Pillar et al. |
| 2005/0113996 A1 | 5/2005 | Pillar et al. |
| 2007/0175250 A1 | 8/2007 | Karcz et al. |
| 2007/0185636 A1 | 8/2007 | Cooley et al. |
| 2008/0059030 A1 | 3/2008 | Quigley et al. |
| 2008/0103651 A1 | 5/2008 | Pillar et al. |
| 2008/0144424 A1 | 6/2008 | Schumacher et al. |
| 2008/0215190 A1 | 9/2008 | Pillar et al. |
| 2008/0215700 A1 | 9/2008 | Pillar et al. |
| 2008/0221741 A1 | 9/2008 | Pillar et al. |
| 2008/0279036 A1 | 11/2008 | Frey et al. |
| 2008/0316856 A1 | 12/2008 | Cooley et al. |
| 2009/0073798 A1 | 3/2009 | Wallgren |
| 2009/0171595 A1 | 7/2009 | Bonilla Benegas |
| 2009/0177482 A1 | 7/2009 | Granruth et al. |
| 2010/0148523 A1 | 6/2010 | Tai |
| 2010/0301668 A1 | 12/2010 | Yakes et al. |
| 2010/0312438 A1 | 12/2010 | Cooley et al. |
| 2011/0029134 A1 | 2/2011 | Hazrati et al. |
| 2012/0077631 A1 | 3/2012 | Wang |
| 2013/0021867 A1 | 1/2013 | Shimizu |
| 2014/0015315 A1 | 1/2014 | Takahashi et al. |
| 2015/0217481 A1 | 8/2015 | Takahashi |
| 2017/0080600 A1 | 3/2017 | Dickerman et al. |
| 2017/0217047 A1 | 8/2017 | Leon et al. |

FOREIGN PATENT DOCUMENTS

| | | |
|---|---|---|
| JP | 2002-172974 A | 6/2002 |
| WO | WO-2015/057380 A1 | 4/2015 |

* cited by examiner

CONCRETE DRUM CONTROL, PROPERTY PREDICTION, AND MONITORING SYSTEMS AND METHODS

CROSS-REFERENCE TO RELATED PATENT APPLICATIONS

This application is a continuation of U.S. patent application Ser. No. 17/462,621, filed Aug. 31, 2021, which is a continuation of U.S. patent application Ser. No. 16/522,453, filed Jul. 25, 2019, which is a continuation of U.S. patent application Ser. No. 15/624,900, filed Jun. 16, 2017, which claims the benefit of and priority to U.S. Provisional Patent Application No. 62/351,891, filed Jun. 17, 2016, U.S. Provisional Patent Application No. 62/406,390, filed Oct. 10, 2016, and U.S. Provisional Patent Application No. 62/414,527, filed Oct. 28, 2016, all of which are incorporated herein by reference in their entireties.

BACKGROUND

Concrete mixer vehicles are configured to receive, mix, and transport wet concrete or a combination of ingredients that when mixed form wet concrete to a job site. To prevent the concrete from setting, concrete mixing vehicles include a rotatable mixing drum that continually mixes the concrete disposed therein. The drum rotation speed may be passively controlled, potentially leading to arriving at a job site with the concrete having undesirable properties.

SUMMARY

One embodiment relates to a drum control system. The drum control system includes one or more processing circuits having programed instructions to control a drum assembly to rotate a drum at a first, unmixed speed to mix drum contents received by the drum where the drum contents including ingredients of a concrete mixture, acquire drum contents data indicative of a property of the drum contents from a mixture sensor and monitor the property of the drum contents as the drum rotates, acquire a target property for the drum contents upon delivery, determine a second, mixed speed based at least partially on the target property, and control the drum assembly to rotate the drum at the second, mixed speed in response to determining that the property of the drum contents indicates that the ingredients have been sufficiently mixed.

Another embodiment relates to a non-transitory computer-readable storage medium having instructions stored thereon that, upon execution by one or more processors, cause the one or more processors to control a drum assembly to rotate a drum at a first, unmixed speed to mix drum contents received by the drum where the drum contents including ingredients of a concrete mixture, acquire drum contents data indicative of a property of the drum contents from a mixture sensor and monitor the property of the drum contents as the drum rotates, acquire a target property for the drum contents upon delivery, determine a second, mixed speed based at least partially on the target property, and control the drum assembly to rotate the drum at the second, mixed speed in response to determining that the property of the drum contents indicates that the ingredients have been sufficiently mixed.

Still another embodiment relates to a drum control system. The drum control system includes one or more processing circuits having programed instructions to control a drum assembly to rotate a drum at a first, unmixed speed to mix drum contents received by the drum, acquire a property of the drum contents as the drum rotates, acquire a target property for the drum contents, and control the drum assembly to rotate the drum at a second, mixed speed in response to determining that the property of the drum contents indicates that the drum contents have been sufficiently mixed. The second, mixed speed is at least partially based on the target property.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
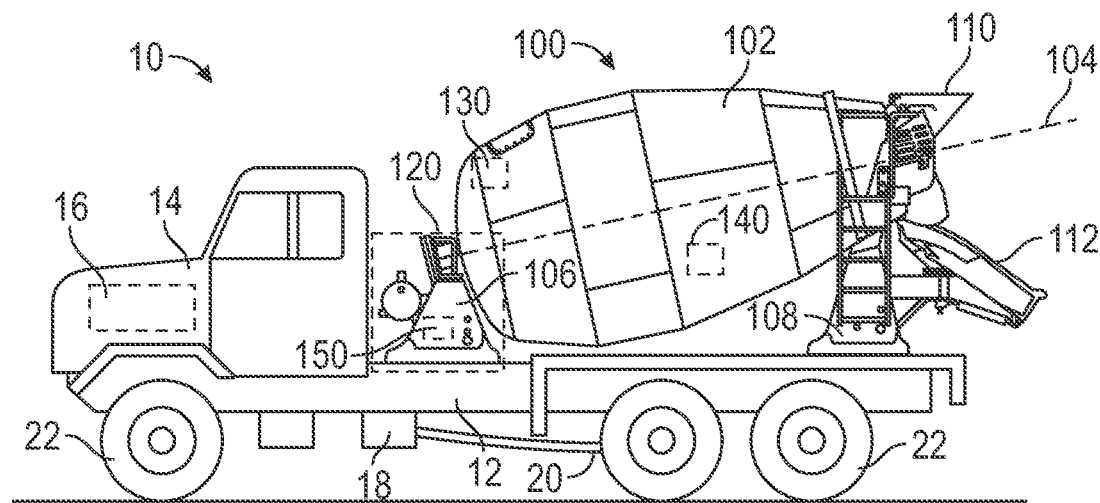
FIG. 1 is a side view of a concrete mixing truck with a drum assembly and a control system, according to an exemplary embodiment.

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

According to an exemplary embodiment, a concrete mixing vehicle includes a drum assembly having a mixing drum, a drive system, and a drum control system. The drum control system may be configured to control the drive system to rotate the mixing drum. Traditional drum control systems may be configured to passively control the rotation and rotational speed of the mixing drum (e.g., at a preset speed, at a preset speed ratio that varies with the engine speed, etc.).

According to an exemplary embodiment, the drum control system of the present disclosure is configured to actively control the rotation and/or rotational speed of the mixing drum to provide and/or maintain target properties for the concrete (e.g., a desired consistency, mixture quality, amount of air entrainment, viscosity, slump, temperature, water content, etc.) during transportation and/or upon arrival at the job site. By way of example, the drum control system may be configured to monitor the properties of the concrete within the mixing drum (e.g., with a sensor, etc.) and adaptably adjust the rotational speed of the mixing drum to provide concrete having desired or target properties (e.g., in response to the current properties of the concrete approaching and/or reaching the target properties, etc.). The drum control system may monitor the concrete property (e.g., slump, etc.), adjust (e.g., increase, etc.) the drum speed in response to an indication that the property is at, approaching, or above a target level (e.g., a slump at, approaching, or above a target slump level, etc.), and adjust (e.g., decrease, etc.) the drum speed in response to an indication that the property is at, approaching, or below the target level. By way of example, the system may be configured to increase the drum speed in response to an indication that the concrete within the drum is at a six (6) slump and decrease the drum speed in response to an indication that the concrete within the drum is at a four (4) slump. The system may be configured to further decrease drum speed, add water or another substance, etc. to keep the concrete within the drum at the target level. In some embodiments, the drum control system is configured to additionally or alternatively control the rotation and/or rotational speed of the mixing drum based on actual and/or anticipated driving behavior and/or road parameters (e.g., acceleration, deceleration, road grades, speed limit changes, stop signs, traffic lights, road curvature, traffic information, traffic patterns, etc.; to prevent concrete from spilling out of the mixing drum; to maintain a desired speed of the mixing drum as the engine speed varies; etc.).

According to an exemplary embodiment, the drum control system of the present disclosure is configured to additionally or alternatively predict a property of a mixture within the mixing drum at delivery based on various data. The various data may include delivery data (e.g., a delivery location, a delivery time, a delivery route, etc.), initial properties of the mixture (e.g., a weight of the mixture, a volume of the mixture, a constituent makeup of the mixture, an initial slump, an initial viscosity, mixed, unmixed, mixed status, etc.), target properties for the mixture (e.g., a desired consistency, mixture quality, amount of air entrainment, viscosity, slump, temperature, water content, etc.), environment data (e.g., an ambient temperature, a relative humidity, wind speed, elevation, precipitation characteristics, road attributes, traffic information/patterns, etc.), mixture data (e.g., current properties of the mixture, etc.), and/or GPS data (e.g., unscheduled stops, road attributes, traffic information/patterns, travel time updates, etc.). The drum control system may be further configured to selectively and/or adaptively control a pump of the drive system (e.g., a throttling element thereof, etc.) to adjust a speed of the mixing drum and provide a target drum speed for the mixing drum (e.g., to achieve a target property for the mixture, based on the predicted delivery properties, etc.).

According to the exemplary embodiment shown in FIGS. 1-4 and 10, a vehicle, shown as concrete mixing truck 10, includes a drum assembly, shown as drum assembly 100, and a control system, shown as drum control system 150. According to an exemplary embodiment, the concrete mixing truck 10 is configured as a rear-discharge concrete mixing truck. In other embodiments, the concrete mixing truck 10 is configured as a front-discharge concrete mixing truck. As shown in FIG. 1, the concrete mixing truck 10 includes a chassis, shown as frame 12, a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixing truck 10 by an operator (e.g., a seat, a steering wheel, hydraulic controls, a user interface, switches, buttons, dials, etc.).

Figure 3:
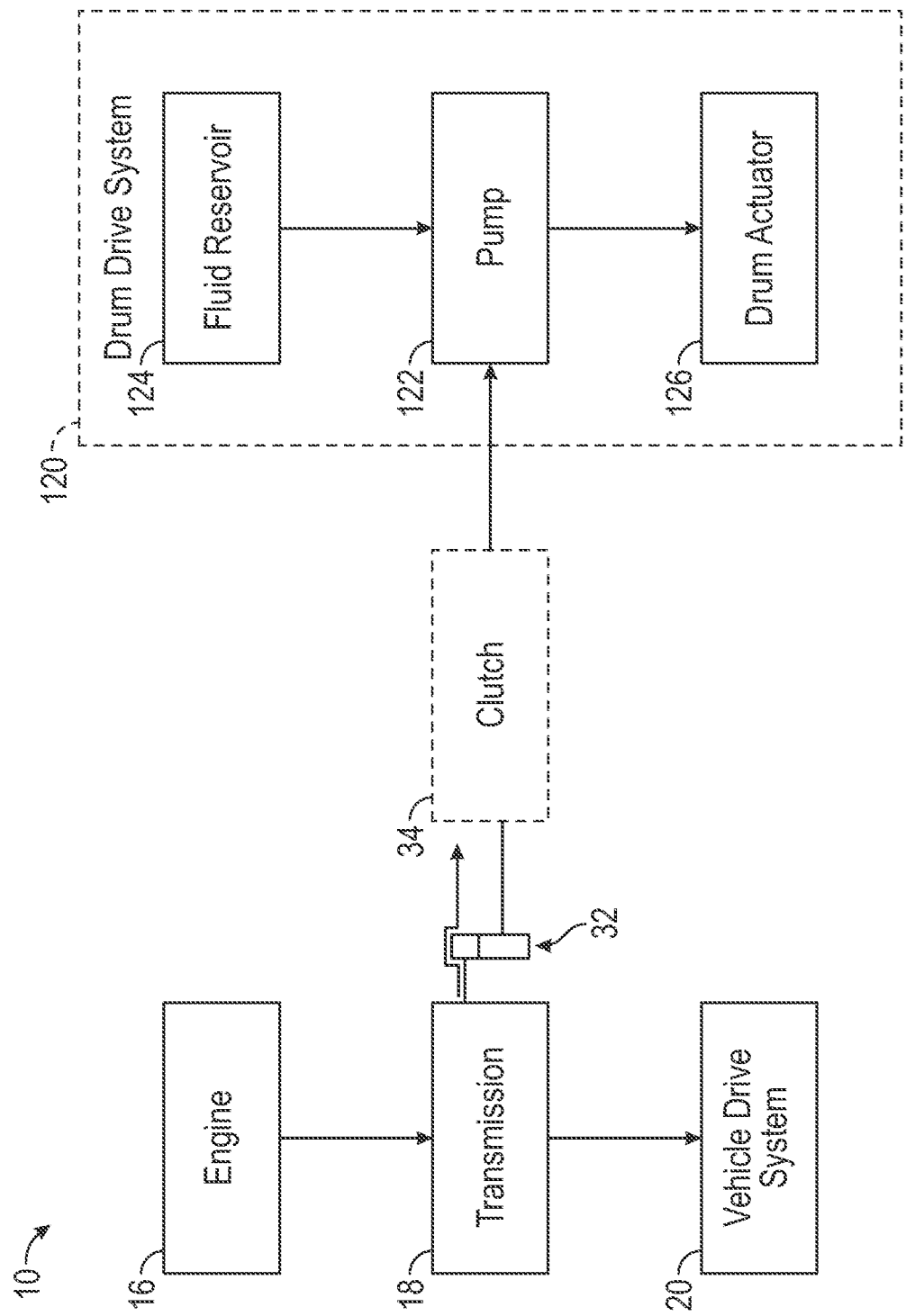
FIG. 3 is a power flow diagram for the concrete mixing truck of FIG. 1 having a drum drive system that is selectively coupled to a transmission with a clutch, according to an exemplary embodiment.

As shown in FIGS. 1 and 3, the concrete mixing truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

As shown in FIGS. 1 and 3, the concrete mixing truck 10 includes a power transfer device, shown as transmission 18. As shown in FIG. 3, the engine 16 is coupled to the transmission 18. In one embodiment, the engine 16 produces mechanical power (e.g., due to a combustion reaction, etc.) that flows into the transmission 18. As shown in FIGS. 1 and 3, the concrete mixing truck 10 includes a first drive system, shown as vehicle drive system 20, that is coupled to the transmission 18. The vehicle drive system 20 may include drive shafts, differentials, and other components coupling the transmission 18 with a ground surface to move the concrete mixing truck 10. As shown in FIG. 1, the concrete mixing truck 10 includes a plurality of tractive elements, shown as wheels 22, that engage a ground surface to move the concrete mixing truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

Figure 2:
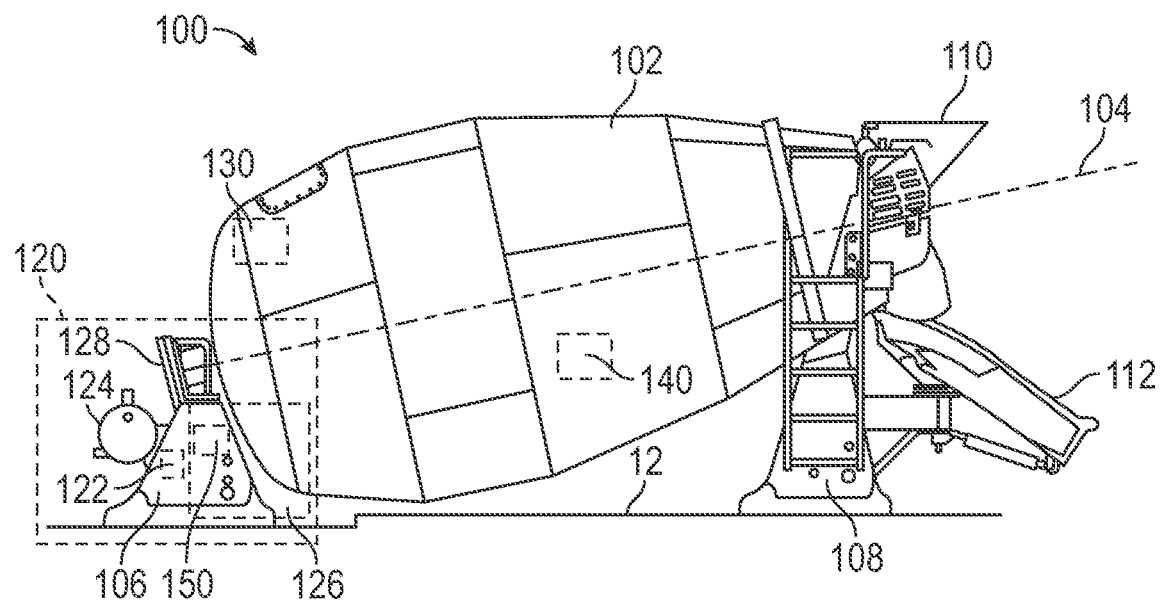
FIG. 2 is a detailed side view of the drum assembly of the concrete mixing truck of FIG. 1, according to an exemplary embodiment.
Figure 10:
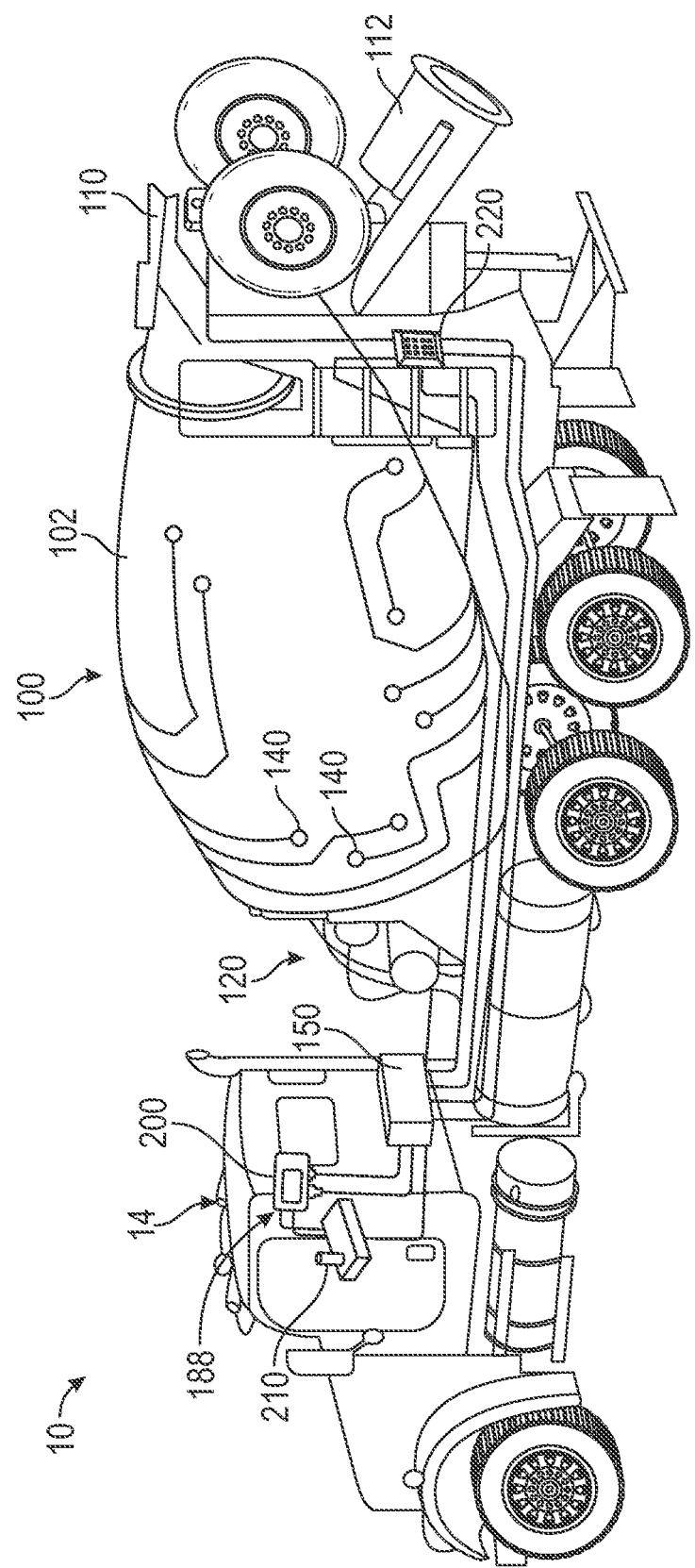
FIG. 10 is a perspective view of the concrete mixing truck of FIG. 1, according to an exemplary embodiment.

As shown in FIGS. 1, 2, and 10, the drum assembly 100 of the concrete mixing truck 10 includes a drum, shown as mixing drum 102. The mixing drum 102 is coupled to the frame 12 and disposed behind the cab 14 (e.g., at a rear and/or middle of the frame 12, etc.). As shown in FIGS. 1, 2, and 10, the drum assembly 100 includes a second drive system, shown as drum drive system 120, that is coupled to the frame 12. The concrete mixing truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixing drum 102 to the frame 12 and facilitate rotation of the mixing drum 102 relative to the frame 12. In an alternative embodiment, the drum assembly 100 is configured as a stand-alone mixing drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIGS. 1 and 2, the mixing drum 102 defines a central, longitudinal axis, shown as axis 104. According to an exemplary embodiment, the drum drive system 120 is configured to selectively rotate the mixing drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the axis 104 to a desired or target angle (e.g., manually in response to an operator input/command, automatically according to a control scheme, etc.).

As shown in FIGS. 1, 2, and 10, the mixing drum 102 of the drum assembly 100 includes an inlet, shown as hopper 110, and an outlet, shown as chute 112. According to an exemplary embodiment, the mixing drum 102 is configured to receive a mixture, such as a concrete mixture (e.g., cementitious material, aggregate, sand, etc.), with the hopper 110. As shown in FIGS. 1 and 2, the mixing drum 102 includes a port, shown as injection port 130. The injection port 130 may provide access into the interior of the mixing drum 102 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port 130 includes an injection valve that facilitates injecting the water and/or the chemicals from a fluid reservoir (e.g., a water tank, etc.) into the mixing drum 102 to interact with the mixture, while preventing the mixture within the mixing drum 102 from exiting the mixing drum 102 through the injection port 130. In some embodiments, the mixing drum 102 includes multiple injection ports 130 (e.g., two injection ports, three injection ports, etc.) configured to facilitate independently injecting different water and/or chemicals into the mixing drum 102. The mixing drum 102 may include a mixing element (e.g., fins, etc.) positioned within the interior thereof. The mixing element may be configured to (i) agitate the contents of mixture within the mixing drum 102 when the mixing drum 102 is rotated by the drum drive system 120 in a first direction (e.g., counterclockwise, clockwise, etc.) and (ii) drive the mixture within the mixing drum 102 out through the chute 112 when the mixing drum 102 is rotated by the drum drive system 120 in an opposing second direction (e.g., clockwise, counterclockwise, etc.).

As shown in FIGS. 2 and 3, the drum drive system 120 includes a pump, shown as pump 122, a reservoir, shown as fluid reservoir 124, and an actuator, shown as drum actuator 126. As shown in FIG. 3, the fluid reservoir 124, the pump 122, and the drum actuator 126 are fluidly coupled. According to an exemplary embodiment, the drum actuator 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum actuator 126. According to an exemplary embodiment, the pump 122 is configured to facilitate selectively and/or adaptively controlling the output of the drum actuator 126. In one embodiment, the pump 122 includes a variable displacement hydraulic pump (e.g., an axial piston pump, etc.) and has a pump stroke that is variable. The pump 122 may be configured to pressurize hydraulic fluid based on the pump stroke (e.g., the greater the pump stroke, the higher the pressure, and the faster the drum actuator 126 rotates the mixing drum 102, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element equal to zero. The pump stroke may increase as the angle of the throttling element increases.

In one embodiment, the throttling element of the pump 122 is movable between a stroked position (e.g., a maximum stroke position, a partially stroked position, etc.) and a destroked position (e.g., a minimum stoke position, a partially destroked position, etc.). According to an exemplary embodiment, an actuator is coupled to the throttling element of the pump 122. The actuator may be positioned to move the throttling element between the stroked position and the destroked position. The drum control system 150 may be configured to generate a first command signal and a second command signal. The first command signal may engage the actuator to move the throttling element of the pump 122 into the destroked position, thereby decreasing the pump stroke. The second command signal may engage the actuator to move the throttling element of the pump 122 into the stroked position, thereby increasing the pump stroke.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

In other embodiments, the drum actuator 126 is or includes an internal combustion engine. In such embodiments, the fluid reservoir 124 may be configured to store liquid and/or gaseous fuel (e.g., gasoline, diesel, propane, natural gas, hydrogen, etc.), and the pump 122 may be configured as a fuel pump. In still other embodiments, the drum actuator 126 is or includes an electric motor. In such embodiments, the fluid reservoir 124 may be an energy storage device (e.g., a battery, a capacitor, etc.) configured to store and provide chemical and/or electrical energy. The drum drive system 120 may not include the pump 122 in such embodiments. According to an exemplary embodiment, the drum actuator 126 is mounted to the concrete mixing truck 10 at the same angle as the axis 104 of the mixing drum 102 (e.g., such that the output of drum actuator 126 rotates about an axis parallel to the axis 104, etc.).

As shown in FIG. 2, the drum drive system 120 includes a drive wheel, shown as drum drive wheel 128, coupled to the mixing drum 102. The drum drive wheel 128 may be welded, bolted, or otherwise secured to the head of the mixing drum 102. The center of the drum drive wheel 128 may be positioned along the axis 104 such that the drum drive wheel 128 rotates about the axis 104. According to an exemplary embodiment, the drum actuator 126 is coupled to the drum drive wheel 128 (e.g., with a belt, a chain, etc.) to facilitate driving the drum drive wheel 128 and thereby rotate the mixing drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum actuator 126 to the mixing drum 102. By way of another example, the drum actuator 126 (e.g., an output thereof, etc.) may be directly coupled to the mixing drum 102 (e.g., along the axis 104, etc.) to rotate the mixing drum 102.

As shown in FIG. 3, the concrete mixing truck 10 includes a power takeoff unit, shown as power takeoff unit 32, that is coupled to the transmission 18. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 3, the power takeoff unit 32 is selectively coupled to the pump 122, with a clutch 34. In some embodiments, the concrete mixing truck 10 does not include the clutch 34. By way of example, the power takeoff unit 32 may be directly coupled to the pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the pump 122. In one embodiment, the actuator includes a solenoid that is electronically actuated according to a clutch control strategy. When the clutch 34 is disengaged, the pump 122 is not coupled to (i.e., is isolated from) the output of the transmission 18. Relative movement between the clutch discs or movement between the clutch discs and another component of the power takeoff unit 32 may be used to decouple the pump 122 from the transmission 18.

In one embodiment, energy flows along a second power path defined from the engine 16, through the transmission 18 and the power takeoff unit 32, and into the pump 122 when the clutch 34 is engaged. When the clutch 34 is disengaged, energy flows from the engine 16, through the transmission 18, and into the power takeoff unit 32. The clutch 34 selectively couples the pump 122 to the engine 16, according to an exemplary embodiment. In one embodiment, energy along the first flow path is used to drive the wheels 22 of the concrete mixing truck 10, and energy along the second flow path is used to operate the drum drive system 120 (e.g., power the pump 122 to drive the drum actuator 126 to thereby rotate the mixing drum 102, etc.). Energy may flow along the first flow path during normal operation of the concrete mixing truck 10 and selectively flow along the second flow path. By way of example, the clutch 34 may be engaged such that energy flows along the second flow path when the pump 122 is used to drive the mixing drum 102. When the pump 122 is not used to drive the mixing drum 102 (e.g., when the mixing drum 102 is empty, etc.), the clutch 34 may be selectively disengaged, thereby conserving energy.

As shown in FIGS. 1, 2, and 10, the drum assembly 100 includes a sensor, shown as sensor 140. According to an exemplary embodiment, the sensor 140 includes a mixture sensor that is positioned within the mixing drum 102 and configured to acquire mixture data indicative of one or more properties of the mixture within the mixing drum 102. In one embodiment, the sensor 140 includes a plurality of mixture sensors (e.g., two, three, four, etc.), each mixture sensor configured to acquire data indicative of at least one of the one or more properties. The one or more properties of the mixture may include a mixture quality, a slump, a consistency of mixture, a viscosity, a temperature, an amount of air entrainment, an amount of water content, a weight, a volume, a rotational velocity, a rotational acceleration, a surface tension, a mixed status, an unmined status, a partially mixed status, etc. of the mixture. The drum control system 150 may be configured to control the rotational speed of the drum actuator 126 by selectively controlling the pump 122 (e.g., the angle of the throttling element thereof, etc.) based on an operator input and/or a property of the mixture within the mixing drum 102 (e.g., as determined based on the mixture data acquired by the sensor 140, etc.) to provide a target or desired property for the mixture. In other embodiments, the sensor 140 of the drum assembly 100 does not include the mixture sensors.

In some embodiments, the sensors 140 include one or more drive system sensors. The drive system sensors may be variously positioned on, around, and/or within one or more components of the drum drive system 120 to acquire drive system data. The drive system data may be indicative of one or more operating characteristics of the drum drive system 120. The operating characteristic may include a speed of the mixing drum 102, a direction of rotation of the mixing drum 102, a pressure associated with the pump 122 (e.g., a hydraulic pressure, an inlet pressure, an outlet pressure, etc.), another hydraulic system pressure, and/or other operating characteristics of the drum drive system 120.

In some embodiments, the sensor 140 includes one or more environment sensors. The environment sensors may be variously positioned on, around, and/or within the concrete mixing truck 10 to acquire environment data. The environment data may be indicative of an environmental characteristic (e.g., external to the mixing drum 102, etc.). The environmental characteristics may include an ambient temperature, a relative humidity, wind speed, elevation, precipitation characteristics (e.g., rain, snow, fog, etc.), road attributes, traffic information/patterns, etc. The environment sensors may include a temperature sensor, a barometer or other pressure sensor, a humidity sensor, a pitot tube, an altimeter, an accelerometer, a camera, a proximity sensor, and/or other sensors configured to acquire information about the environment external to the mixing drum 102.

By way of example, during operation, the mixing drum 102 may be loaded with a concrete mixture through the hopper 110. The drum drive system 120 may be operated to rotate the mixing drum 102 in a first direction to mix and agitate the concrete mixture contained in the mixing drum 102 with the mixing element. Water and/or chemicals may be pumped into the mixing drum 102 through the injection port 130 to provide a desired property of the concrete mixture and/or to prevent the concrete mixture from setting within the mixing drum 102. The concrete mixing truck 10 may transport the mixture to a job site (e.g., a construction site, etc.). During such transportation, the drum control system 150 may be configured to selectively and/or adaptively control the drum drive system 120 (e.g., the pump 122 to increase or decrease a speed of the drum actuator 126, etc.) to provide a target drum speed. The drum control system 150 may be configured to control the drum drive system 120 based on mixture data acquired by the sensors 140 such that the concrete mixture within the mixing drum 102 has one or more desired or target properties (e.g., a desired consistency, mixture quality, amount of air entrainment, viscosity, slump, temperature, water content, etc.) during transportation and/or upon arrival at the job site. Upon arrival at the job site with the concrete mixture having the one or more desired properties, the drum drive system 120 may be operated to rotate the mixing drum 102 in an opposing second direction. The rotation of the mixing element in the opposing second direction may cause the mixing element to carry the concrete mixture out of the mixing drum 102. The chute 112 of the drum assembly 100 may be used to dispense and guide the concrete mixture away from the frame 12 of the concrete mixing truck 10 to the concrete mixture's destination (e.g., a concrete form, a wheelbarrow, a concrete pump machine, etc.).

Drum Control and Property Prediction System

Figure 4:
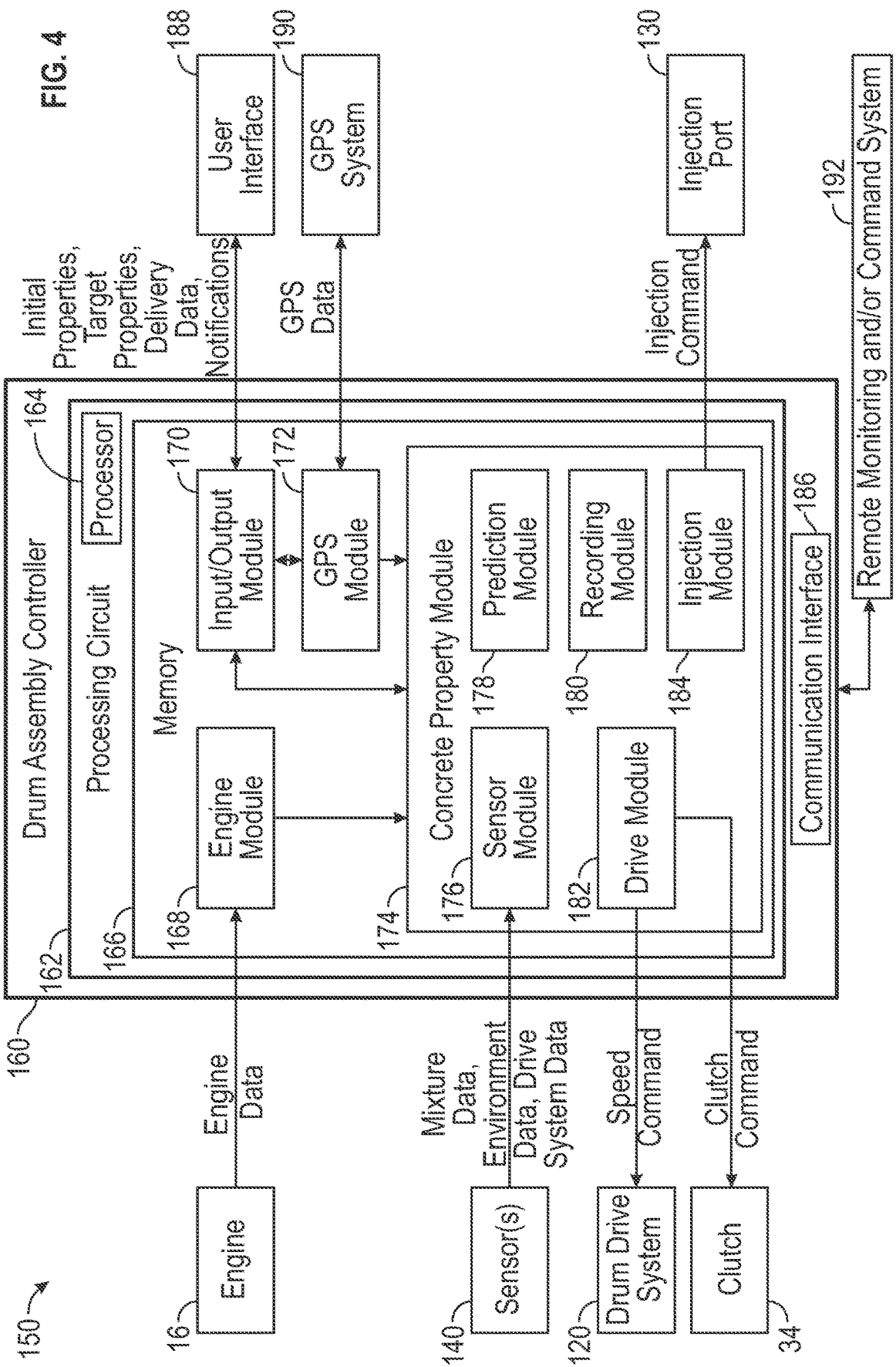
FIG. 4 is a schematic diagram of the control system for the concrete mixing truck of FIG. 1, according to an exemplary embodiment.

According to the exemplary embodiment shown in FIG. 4, the drum control system 150 for the drum assembly 100 of the concrete mixing truck 10 includes a controller, shown as drum assembly controller 160. In one embodiment, the drum assembly controller 160 is configured to selectively engage, selectively disengage, control, and/or otherwise communicate with components of the drum assembly 100 and/or the concrete mixing truck 10 (e.g., actively control the components thereof, etc.). As shown in FIG. 4, the drum assembly controller 160 is coupled to the engine 16, the clutch 34, the drum drive system 120 (e.g., the pump 122, etc.), the injection port 130 (e.g., the injection valve thereof, etc.), the sensor(s) 140, a user interface 188, and a global positioning system (GPS) 190. In other embodiments, the drum assembly controller 160 is coupled to more or fewer components. The drum assembly controller 160 may be configured to predict a property of the mixture within the mixing drum 102 at delivery based on various data (e.g., delivery data, initial properties, target properties, environment data, mixture data, GPS data, etc.). The drum assembly controller 160 may be further configured to selectively and/or adaptively control the pump 122 (e.g., the throttling element thereof, etc.) to adjust a speed of the drum actuator 126 and provide a target drum speed for the mixing drum 102 (e.g., to achieve a target property for the mixture, etc.). By way of example, the drum assembly controller 160 may send and receive signals with the engine 16, the clutch 34, the drum drive system 120, the injection port 130, the sensor 140, the user interface 188, and/or the GPS 190. In one embodiment, the drum assembly controller 160 is configured to selectively turn on and selectively turn off one or more of the various functionalities described herein. The drum assembly controller 160 may turn on and turn off one or more of the various functionalities automatically, based on user requests during initial manufacture, and/or based on user input.

The drum assembly controller 160 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, the drum assembly controller 160 includes a processing circuit 162 having a processor 164 and a memory 166. The processing circuit 162 may include an ASIC, one or more FPGAs, a DSP, circuits containing one or more processing components, circuitry for supporting a microprocessor, a group of processing components, or other suitable electronic processing components. In some embodiments, the processor 164 is configured to execute computer code stored in the memory 166 to facilitate the activities described herein. The memory 166 may be any volatile or non-volatile computer-readable storage medium capable of storing data or computer code relating to the activities described herein. According to an exemplary embodiment, the memory 166 includes computer code modules (e.g., executable code, object code, source code, script code, machine code, etc.) configured for execution by the processor 164.

As shown in FIG. 4, the memory 166 includes various modules for completing processes described herein. More particularly, the memory 166 includes an engine module 168, an input/output (I/O) module 170, a GPS module 172, and a concrete property module 174 including a sensor module 176, a prediction module 178, a recording module 180, a drive module 182, and an injection module 184. While various modules with particular functionality are shown in FIG. 4, it should be understood that the drum assembly controller 160 and the memory 166 may include any number of modules for completing the functions described herein. For example, the activities of multiple modules may be combined as a single module and additional modules with additional functionality may be included. Further, it should be understood that the drum assembly controller 160 may further control other processes beyond the scope of the present disclosure.

As shown in FIG. 4, the engine module 168 is coupled to the engine 16. The engine module 168 may be configured to receive engine data from the engine 16. The engine data may include performance characteristics of the engine 16 including engine speed (e.g., revolutions-per-minute (RPMs), etc.), engine torque, and/or engine acceleration. As shown in FIG. 4, the engine module 168 is coupled to the concrete property module 174 such that the concrete property module 174 may receive and interpret the engine data when controlling the drum drive system 120.

As shown in FIG. 4, the I/O module 170 is coupled to the user interface 188. In one embodiment, the user interface 188 includes a display and an operator input. The display may be configured to display a graphical user interface, an image, an icon, a notification, and/or still other information. In one embodiment, the display includes a graphical user interface configured to provide general information about the concrete mixing truck 10 (e.g., vehicle speed, fuel level, warning lights, etc.). The graphical user interface may also be configured to display a speed of the mixing drum 102, an indication of one or more predicted properties of the mixture within the mixing drum 102 at delivery (e.g., temperature, viscosity, slump, mix quality, an amount of air entrainment, water content, a weight, a volume, etc.), a notification in response to the one or more properties of the mixture reaching a target value/amount (e.g., a desired slump, temperature, viscosity, mix quality, amount of air entrainment, water content, etc.), and/or still other information relating to the drum assembly 100 and/or the mixture within the mixing drum 102.

The operator input may be used by an operator to provide commands and/or information (e.g., initial properties of the mixture, target properties for the mixture, delivery data for the mixture, etc.) to at least one of the clutch 34, the drum drive system 120, the injection port 130, the I/O module 170, the GPS module 172, the concrete property module 174, and the GPS 190. The operator input may include one or more buttons, knobs, touchscreens, switches, levers, joysticks, pedals, a steering wheel, and/or handles. The operator input may facilitate manual control of some or all aspects of the operation of the concrete mixing truck 10. It should be understood that any type of display or input controls may be implemented with the systems and methods described herein.

The I/O module 170 may be configured to receive information regarding initial properties of the mixture and/or target properties for the mixture from the user interface 188, from a customer device, and/or from a device of the concrete plant. The initial properties of the mixture may include a weight of the mixture, a volume of the mixture (e.g., yards of concrete, etc.), a constituent makeup of the mixture (e.g., amount of cementitious material, aggregate, sand, water content, air entrainers, water reducers, set retarders, set accelerators, superplasticizers, corrosion inhibitors, coloring, calcium chloride, minerals, etc.), an initial slump, an initial viscosity, and/or any other properties known about the mixture prior to and/or upon entry thereof into the mixing drum 102. The target properties for the mixture may include a desired consistency, mixture quality, amount of air entrainment, viscosity, slump, temperature, water content, and/or still other properties. As shown in FIG. 4, the I/O module 170 is coupled to the concrete property module 174 such that the concrete property module 174 may receive, interpret, and/or record the initial properties of the mixture and/or the target properties for the mixture to predict the delivery properties for the mixture and/or when controlling the drum drive system 120 to provide the target properties for the mixture. In some embodiments, at least a portion of the initial properties and/or target properties are predefined within batching software (e.g., a standard initial property in batching software associated with the concrete plant, a standard target property in batching software associated with the concrete plant, software associated with the memory 166 and/or the concrete property module 174 of the drum assembly controller 160, etc.).

The I/O module 170 may be configured to receive a target drum life for the mixing drum 102 (e.g., a number of yards and mix of concrete the mixing drum 102 is designed to receive throughout an operating lifetime thereof, a number of yards of concrete the mixing drum 102 is designed to receive throughout an operating lifetime thereof without regard for the particular mix of the concrete, an operational life of the mixing element within the mixing drum 102, a relationship between mixing element degradation and operational time, etc.) and/or a type of the mixing drum 102 (e.g., capacity, shape, manufacturer, a front discharge mixing drum, a rear discharge mixing drum, a thickness of a sidewall or other portion of the mixing drum 102, type and/or identity of materials the mixing drum 102 is manufactured from, dimensional characteristics, etc.) from the user interface 188 and/or from a device of the concrete plant. In some embodiments, at least one of the target drum life and the type of the mixing drum 102 are predefined within the drum assembly controller 160 (e.g., the memory 166, the drive module 182, etc.).

The I/O module 170 may be configured receive delivery data regarding a delivery time, a delivery location (e.g., address of a job site, etc.), and/or a delivery route (e.g., based on road load parameters, etc.) for the mixture from the user interface 188. As shown in FIG. 4, the I/O module 170 is coupled to the GPS module 172 such that the GPS module 172 may receive the delivery data from the I/O module 170. The GPS module 172 may be configured to transmit the delivery data to the GPS 190. The GPS 190 may be configured to receive and interpret the delivery data from the GPS module 172 and return GPS data to the GPS module 172. The GPS module 172 may be configured to receive the GPS data from the GPS 190. The GPS data may include turn-by-turn driving instructions, travel distance, and/or travel time from a current location of the concrete mixing truck 10 to the destination. Such information may be transmitted from the GPS module 172 to the I/O module 170 for display to the operator on the user interface 188 to provide route guidance and/or to the concrete property module 174 for interpretation and/or recordation to predict the delivery properties for the mixture and/or when controlling the drum drive system 120 to provide the target properties for the mixture.

The GPS data may additionally or alternatively include road attributes at and/or ahead of a current location of the concrete mixing truck 10. The road attributes may include road grade, road curvature, speed limits, stop sign locations, traffic light locations, road classifications (e.g., arterial, collector, local, etc.), on/off ramp locations, altitude, etc. The road attributes may be utilized and/or monitored to detect changes therein (e.g., changes in elevation, etc.). In some embodiments, the GPS module 172 is configured to record road attributes (e.g., road grades, stop light locations, stop sign locations, altitude, etc.) without or in addition to receiving the GPS data from the GPS 190. In such embodiments, the GPS module 172 may be configured to learn as the concrete mixing truck 10 is driving along various routes such that the road attributes are known when the same route is encountered or will be encountered in the future. The GPS data may additionally or alternatively provide information regarding traffic information and/or traffic patterns at and/or ahead of the concrete mixing truck 10. The concrete mixing truck 10 may include various sensors (e.g., accelerometers, gyroscopes, inclinometers, cameras, barometric or other pressure sensors, altimeters, environment sensors, etc.) variously positioned on, around, and/or within the concrete mixing truck 10 to acquire at least some of the road attributes. The sensors may also be configured to provide information regarding traffic information and/or traffic patterns (e.g., a vehicle slowing down, obstacles in the road, etc.). As shown in FIG. 4, the GPS module 172 is coupled to the concrete property module 174 such that the concrete property module 174 may receive, interpret, and/or record the GPS data (e.g., the road attributes, traffic information, and/or traffic patterns from the GPS 190; the road attributes, traffic information, and/or traffic patterns from the sensors;

etc.) when predicting the delivery properties for the mixture and/or when controlling the drum drive system 120 to provide the target properties for the mixture.

As shown in FIG. 4, the sensor module 176 is coupled to the sensors 140 (e.g., the mixture sensors, the environment sensors, etc.). The sensor module 176 may be configured to receive the mixture data and/or the environment data from the sensors 140. The mixture data may include one or more current properties of the mixture within the mixing drum 102. The one or more properties of the mixture may include a current slump, a current mixture quality, a current viscosity, a current temperature, a current amount of air entrainment, a current water content, a current weight, a current volume, a current rotational velocity, a current rotational acceleration, a current surface tension, a mixed status, an unmixed status, a partially mixed status, etc. of the mixture. The environment data may include one or more environmental characteristics. The environmental characteristics may include an ambient temperature, a relative humidity, wind speed, elevation, precipitation characteristics (e.g., rain, snow, fog, etc.), traffic information/patterns, road attributes, etc. In some embodiments, the sensor module 176 is configured to receive at least a portion of the environment data from an internet based service (e.g., a weather and/or topography service that may be accessed by and/or provided to the sensor module 176 and based on a current location of the concrete mixing truck 10, etc.).

The sensor module 176 may be configured to analyze the mixture data to determine various properties of the mixture (e.g., slump, mix status, etc.). By way of example, the sensor module 176 may employ a fluids and/or physics model configured to analyze various measurable characteristics of the mixture (e.g., velocity, acceleration, viscosity, air contents, surface tension, etc.) to estimate the slump of the mixture (e.g., slump may not be directly measured, etc.). For example, the slump may be determined based on the flow characteristics of the mixture within the mixing drum 102 as the mixing drum 102 rotates.

According to an exemplary embodiment, the concrete property module 174 is configured to receive, interpret, and/or record at least one of the engine data (e.g., engine speed, etc.), the initial mixture properties (e.g., a weight of the mixture, a volume of the mixture, a constituent makeup of the mixture, etc.), the GPS data (e.g., road attributes, traffic information, etc.), the mixture data (e.g., current properties of the mixture, etc.), and/or the environment data to predict delivery properties for the mixture within the mixing drum 102. The concrete property module 174 may be further configured to selectively and/or adaptively control the drive speed of the drum drive system 120 to achieve the target properties (e.g., a desired consistency, mixture quality, amount of air entrainment, viscosity, slump, temperature, water content, etc.) for the mixture during transport and/or upon arrival at the destination and/or maintain the target properties if achieved prior to arriving at the destination based on the various data.

The prediction module 178 may be configured to predict delivery properties for the mixture based on the initial properties, the target properties, the delivery data, the environment data, the GPS data, the drive system data, and/or the mixture data. The prediction module 178 may be configured to additionally or alternatively predict the delivery properties for the mixture based on a current state of the mixing drum 102 or components thereof. The prediction module 178 may be configured to additionally or alternatively predict the delivery properties for the mixture based on a current state of the mixing drum 102 or components thereof relative to one or more associated target life values (e.g., where the mixing drum 102 is at in its life cycle, where mixing elements or other components of the mixing drum 102 are at in their life cycle, mint, like-new, average, poor, degraded, etc.). The prediction module 178 may be configured to additionally or alternatively predict the delivery properties for the mixture based on the type of the mixing drum 102. By way of example, the prediction module 178 may be configured to determine the current state (e.g., the amount of degradation, etc.) of the mixing drum 102 and/or components thereof (e.g., the mixing element, the fin, etc.). The prediction module 178 may determine the current state (e.g., using a degradation profile, etc.) based on a time of use, an amount of mixture mixed during the time of use (e.g., yards of mixture, etc.), an average rotational speed of the mixing drum 102, a rotational speed profile of the mixing drum 102 (e.g., a history of speed over time, etc.), and/or still other operational characteristics of the mixing drum 102. According to an exemplary embodiment, the current state of the mixing drum 102 affects the properties of the mixture.

In some embodiments, the prediction module 178 is configured to provide an indication of the predicted delivery properties for the mixture to the I/O module 170 such that the indication may be displayed to the operator on the user interface 188. In some embodiments, the indication is sent to a plant device at a concrete plant and/or a device of a customer. The prediction module 178 may be configured to continuously and/or periodically update the prediction during transit based on various adjustments performed by the mixing drum 102 and/or other devices, and/or based on external characteristics. By way of example, the prediction may be updated as the rotational speed of the mixing drum 102 is adaptively controlled. By way of another example, the prediction may be updated as water and/or chemicals are injected into the mixing drum 102. By way of another example, the prediction may be updated as the current properties of the mixture change. By way of still another example, the prediction may be updated as the environmental characteristics (e.g., ambient temperature, altitude, humidity, etc.) change. By way of yet another example, the prediction may be updated as the travel time to the destination changes (e.g., due to accidents, traffic jams, road conditions, detours, etc.).

The recording module 180 may be configured to record the delivery data, the initial properties, the target properties, the predicted delivery properties, the adjustments, the environment data, the mixture data, the GPS data, and/or actual delivery data (e.g., measured by the operator and/or quality personnel and/or the mixture sensor at delivery, etc.) to facilitate generating and/or updating a prediction algorithm stored within and operated by the prediction module 178. Such generation and/or updating of the prediction algorithm may facilitate providing more accurate prediction and/or control of a mixture's properties during future deliveries. Additionally, once a sufficient amount of data has been compiled, the prediction algorithm may facilitate the elimination of the mixture sensor from the mixing drum 102. By way of example, the initial properties of the mixture may be determined with the sensor 140, provide by an operator of the plant, determined with sensors at the plant and provided to the drum assembly controller 160, and/or determined using look-up tables (e.g., based on the compiled data, etc.) with the drum assembly controller 160 and/or thereafter provided to the drum assembly controller 160. The predicted delivery properties and/or the mixture data may then be determined by the prediction module 178 using the prediction algorithm based on the initial properties, various adjustments performed during transit, the environmental data, and/or the GPS data (e.g., using the previously recorded data, look-up tables, etc.) without measurement thereof with a sensor. Such removal of the mixture sensor may reduce the cost to manufacture and operate the concrete mixing truck 10.

In some embodiments, the prediction module 178 and/or the recording module 180 are additionally or alternatively remotely positioned relative to the drum assembly controller 160 and/or the concrete mixing truck 10 (e.g., in a remote monitoring and/or command system, etc.). By way of example, the prediction module 178 and/or the recording module 180 may be remotely positioned on a server system and operate as a cloud-based system (e.g., a remote monitoring and/or command system, etc.) for the concrete mixing truck 10. As such, the data recordation, analysis, and/or determinations made by the drum assembly controller 160 described herein may be additionally or alternatively performed remotely from the concrete mixing truck 10 and then communicated to the drum assembly controller 160 (e.g., the drive module 182, the injection module 184, etc.) for implementation.

As an example, the drum assembly controller 160 may include a communications interface 186 that facilitates long-range wireless communication with a remote monitoring and/or command system 192. The remote monitoring and/or command system 192 may include a processing circuit having a processor and a memory, and a communications interface (e.g., like the processing circuit 162, the communications interface 186, etc. of the drum assembly controller 160). The communications interface of the remote monitoring and/or command system 192 may be configured to receive various information and/or data (e.g., the initial properties, the target properties, the environment data, the GPS data, the mixture data, the en route data, information regarding adjustments made by the drum assembly 100, the drive system data, etc.) from the drum assembly controller 160 and/or other external systems (e.g., a weather service, a topography service, a GPS service, a user input device, a batching system, etc.). The remote monitoring and/or command system 192 may record and analyze the various information and data and perform the functions of the prediction module 178 and/or the recording module 180 described herein. The remote monitoring and/or command system 192 may further be configured to provide commands to the drum assembly controller 160 for the drive module 182 and/or the injection module 184 to implement (e.g., speed commands, injection commands, etc.). Therefore, any of the functions performed by the drum assembly controller 160 described herein may be remotely controlled by the remote monitoring and/or command system 192.

As shown in FIG. 4, the drive module 182 is coupled to the clutch 34 and the drum drive system 120 (e.g., the pump 122, etc.). The drive module 182 may be configured to send a clutch command to the clutch 34 and/or a speed command to the drum drive system 120. The clutch command may be transmitted by the drive module 182 to the clutch 34 to engage or disengage the clutch 34 to selectively couple the drum drive system 120 to the engine 16 to facilitate rotating the mixing drum 102 or stopping the rotation thereof. The clutch command may be transmitted in response to a user input to start or stop the rotation of the mixing drum 102, in response to the mixing data from the sensor 140 indicating that a mixture has be poured into or removed from the mixing drum 102, and/or in response to receiving a signal from a concrete plant indicating that loading of the mixing drum 102 has started. In other embodiments, the drive module 182 does not provide a clutch command (e.g., in embodiments where the concrete mixing truck 10 does not include the clutch 34, etc.).

The drive module 182 may be configured to transmit the speed command to the drum drive system 120 (e.g., to the pump 122, while the clutch 34 is engaged, etc.) to selectively and/or adaptively control the drive speed of the mixing drum 102. In some embodiments, the drive module 182 is configured to modulate the flow from the pump 122 (e.g., by controlling the angle/position of the throttling element thereof, etc.) to control the drive speed of the drum actuator 126 based on the engine speed as indicated by the engine data. By way of example, the drive module 182 may be configured to actively control the pump 122 as the concrete mixing truck 10 is driving such that as the engine speed changes, the drive speed of the mixing drum 102 remains at a desired or target drive speed. In one example, the drive module 182 may decrease the angle of the throttling element as the engine speed increases such that the pump 122 maintains a constant output to maintain the target drive speed of the mixing drum 102. In another example, the drive module 182 may increase the angle of the throttling element as the engine speed decreases such that the pump 122 maintains a constant output to maintain the target drive speed of the mixing drum 102.

By way of another example, the drive module 182 may actively control the pump 122 in response to actual and/or anticipated accelerations and/or decelerations of the concrete mixing truck 10. In an rear-discharge vehicle example, the drive module 182 may maintain or increase the angle of the throttling element as the concrete mixing truck 10 accelerates such that the output of the pump 122 increases, thereby causing the drive speed of the mixing drum 102 to increase. Such an increase in the drive speed of the mixing drum 102 may cause the mixing element of the mixing drum 102 to drive the mixture contained therein forward, preventing the mixture from spilling out of the rear of the mixing drum 102. In a front-discharge vehicle example, the drive module 182 may increase the angle of the throttling element as the concrete mixing truck 10 decelerates such that the output of the pump 122 increases, thereby causing the drive speed of the mixing drum 102 to maintain constant or increase. Such an increase in the drive speed of the mixing drum 102 may cause the mixing element of the mixing drum 102 to drive the mixture contained therein rearward, preventing the mixture from spilling out of the front of the mixing drum 102.

In some embodiments, the drive module 182 is configured to modulate the flow out the pump 122 to control the drive speed of the drum actuator 126 based on the GPS data. By way of example, the drive module 182 may actively control the pump 122 as the concrete mixing truck 10 encounters and/or anticipates that the concrete mixing truck 10 will encounter various different road parameters. In one example, the GPS data may indicate a road grade increase ahead (e.g., a hill, etc.). In an rear-discharge vehicle example, the drive module 182 may increase the angle of the throttling element as the concrete mixing truck 10 approaches a hill such that the output of the pump 122 increases, thereby causing the drive speed of the mixing drum 102 to increase. Such an increase in the drive speed of the mixing drum 102 may cause the mixing element of the mixing drum 102 to drive the mixture contained therein forward, preventing the mixture from spilling out of the rear of the mixing drum 102.

In another example, the GPS data may indicate a stop light, a stop sign, a slowing vehicle, and/or other obstacles are ahead of the concrete mixing truck 10. In a front-discharge vehicle example, the drive module 182 may increase the angle of the throttling element in preparation for the deceleration of the concrete mixing truck 10 such that the output of the pump 122 increases, thereby causing the drive speed of the mixing drum 102 to increase. Such an increase in the drive speed of the mixing drum 102 may cause the mixing element of the mixing drum 102 to drive the mixture contained therein rearward, preventing the mixture from spilling out of the front of the mixing drum 102. In a rear-discharge vehicle example, the drive module 182 may increase the angle of the throttling element in preparation for the acceleration of the concrete mixing truck 10 after slowing down and/or stopping such that the output of the pump 122 increases, thereby causing the drive speed of the mixing drum 102 to increase. Such an increase in the drive speed of the mixing drum 102 may cause the mixing element of the mixing drum 102 to drive the mixture contained therein forward, preventing the mixture from spilling out of the rear of the mixing drum 102.

In yet another example, the GPS data may indicate that the concrete mixing truck 10 is (i) approaching and/or traveling on an off ramp and/or (ii) approaching and/or traveling on a corner or curvature in the road. The drive module 182 may decrease the angle of the throttling element in response to the indication such that the output of the pump 122 decreases, thereby causing the drive speed of the mixing drum 102 to decrease. In other embodiments, the drive module 182 otherwise decreases the drive speed of the mixing drum 102 in response to the indication. Such a decrease in the drive speed of the mixing drum 102 may further stabilize the concrete mixing truck 10 while cornering and/or exiting from highways (e.g., taking an off ramp, etc.).

In some embodiments, the drive module 182 is configured to modulate the flow from the pump 122 to selectively and/or adaptively control the drive speed of the drum actuator 126 based on the initial properties of the mixture, the predicted delivery properties (e.g., determined based on the initial properties, the delivery data, the environment data, the mixture data, the GPS data, the engine data, the target properties, the drum life of the mixing drum 102, the type of the mixing drum 102, etc.), and/or the mixture data indicating the current properties to provide the target properties (e.g., a desired consistency, mixture quality, amount of air entrainment, viscosity, slump, temperature, water content, etc.). In some embodiments, the drive module 182 is additionally or alternatively configured to modulate the flow from the pump 122 to selectively and/or adaptively control the drive speed of the drum actuator 126 based on the target drum life for the mixing drum 102 and/or the type of the mixing drum 102. According to an exemplary embodiment, increasing the drive speed of the drum actuator 126 increases the rotational speed of the mixing drum 102. The increase in the rotational speed of the mixing drum 102 may increase the temperature of the mixture (e.g., reducing the water content thereof, etc.), and decrease the slump while increasing the viscosity of the mixture at an increased rate (e.g., relative to a lower rotational speed, etc.). According to an exemplary embodiment, a reduced drive speed of the drum actuator 126 provides a decreased rotational speed for the mixing drum 102. The decrease in the rotational speed of the mixing drum 102 may provide a constant or decreased temperature of the mixture and (i) maintain the slump and viscosity of the mixture or (ii) decrease the slump while increasing the viscosity at a reduced rate (e.g., relative to a higher rotational speed, etc.).

As shown in FIG. 4, the injection module 184 is coupled to the injection port 130 (e.g., injection valve thereof, etc.). The injection module 184 may be configured to send an injection command to the injection port 130. The injection command may be transmitted by the injection module 184 to the injection port 130 to inject water and/or chemicals into the mixing drum 102 from the fluid reservoir.

In some embodiments, the injection module 184 is configured to selectively control the valve of the injection port 130 to adaptively modulate an amount of water and/or chemicals that are injected into the mixing drum 102 before, during, and/or after transit. Such injection of water and/or chemicals may be used to supplement and/or replace adaptively controlling the drive speed of the mixing drum 102 to provide the target properties for the mixture. Such injection may be limited to a threshold amount of water and/or chemicals, and/or limited based on GPS location of the concrete mixing truck 10. By way of example, the injection module 184 may be configured to prevent an operator of the concrete mixing truck 10 and/or the drum control system 150 from introducing more than a predetermined, threshold amount of water and/or chemicals to the mixture (e.g., indicated by a concrete plant, indicated by the target properties, etc.) to inhibit saturating the mixture with liquid. By way of another example, injection module 184 may be configured to prevent an operator of the concrete mixing truck 10 and/or the drum control system 150 from introducing water and/or chemicals to the mixture based on the GPS location of the concrete mixing truck 10. For example, the injection module 184 may selectively prevent the injection of water and/or chemicals after the concrete mixing truck 10 arrives at a job site.

By way of example, the drive module 182 may be configured to selectively and/or adaptively control the drive speed of the drum actuator 126 such that the target properties for the mixture are achieved upon arrival of the concrete mixing truck 10 at the destination. As an example, the mixing drum 102 may be filled with a concrete mixture. At least some of the initial properties of the concrete mixture may be entered manually by an operator using the user interface 188 and/or at least some of the initial properties of the concrete mixture may be acquired by the sensors 140. The operator may enter target properties for the concrete mixture (e.g., customer desired properties, etc.) and/or a desired destination for the concrete mixture using the user interface 188. The concrete property module 174 may be configured to determine a target drive speed for the mixing drum 102 based on (i) the distance, travel time, and/or road parameters between the current location of the concrete mixing truck 10 and the destination (e.g., indicated by the GPS data, etc.), (ii) the initial properties of the concrete mixture (e.g., manually entered, measured, etc.), and/or (iii) the target properties for the concrete mixture upon arrival. The drive module 182 may then engage the clutch 34 using the clutch command (e.g., if the concrete mixing truck 10 includes the clutch 34, etc.) and provide the speed command to the drum drive system 120 to operate the drum actuator at the target drive speed. During transit, the concrete property module 174 may be configured to (i) periodically or continually monitor the mixture data with the sensors 140 indicating the current properties of the concrete mixture to adjust the target drive speed (e.g., to a second drive speed, etc.) if the target properties are being approached too quickly (e.g., slow down the mixing drum 102, etc.) or too slowly (e.g., speed up the mixing drum 102, etc.) and/or (ii) adjust the target drive speed (e.g., to a second drive speed, etc.) based on the engine data and/or the GPS data (e.g., during acceleration, during deceleration, when encountering hills, when encountering stop signs or stop lights, when encountering traffic, when encountering curves, when encountering on/off ramps, to keep the concrete mixture within the mixing drum 102, to further stabilize the concrete mixing truck 10, etc.). In some embodiments, the concrete property module 174 is configured to change (e.g., modify, alter, reduce, increase, etc.) the drive speed of the mixing drum 102 while measurement of the properties of the concrete mixture is being performed by the sensors 140.

By way of another example, the drive module 182 may be configured to selectively and/or adaptively control the drive speed of the drum actuator 126 to maintain the target properties for the mixture if achieved prior to the concrete mixing truck 10 arriving at the destination. As an example, the mixing drum 102 may be filed with a concrete mixture. At least some of the initial properties of the concrete mixture may be entered manually by an operator using the user interface 188 and/or at least some of the initial properties of the concrete mixture may be acquired by the sensors 140. The operator may enter target properties for the concrete mixture (e.g., customer desired properties, etc.). The concrete property module 174 may be configured to determine a target drive speed for the mixing drum 102 based on (i) the initial properties of the concrete mixture (e.g., manually entered, measured, etc.) and (ii) the target properties for the concrete mixture. The drive module 182 may then engage the clutch 34 using the clutch command (e.g., if the concrete mixing truck 10 includes the clutch 34, etc.) and provide the speed command to the drum drive system 120 to operate the drum actuator at the target drive speed. During transit, the concrete property module 174 may be configured to (i) periodically or continually monitor the mixture data with the sensors 140 indicating the current properties of the concrete mixture to adjust the target drive speed if the target properties are being approached too quickly (e.g., slow down the mixing drum 102, etc.) or too slowly (e.g., speed up the mixing drum 102, etc.) and/or (ii) adjust the target drive speed based on the engine data and/or the GPS data (e.g., during acceleration, during deceleration, when encountering hills, when encountering stop signs or stop lights, when encountering traffic, when encountering curves, when encountering on/off ramps, to keep the concrete mixture within the mixing drum 102, to further stabilize the concrete mixing truck 10, etc.). Once the target properties are reached or about to be reached, as indicated by sensor inputs, the concrete property module 174 may be configured to determine and operate the drum drive system 120 at a second target drive speed to achieve and/or maintain the target properties (e.g., to prevent overshoot, to prevent reducing the slump too much, to prevent increasing the viscosity too much, from a concrete plant, etc.).

Drum Control Methods

Figure 5:
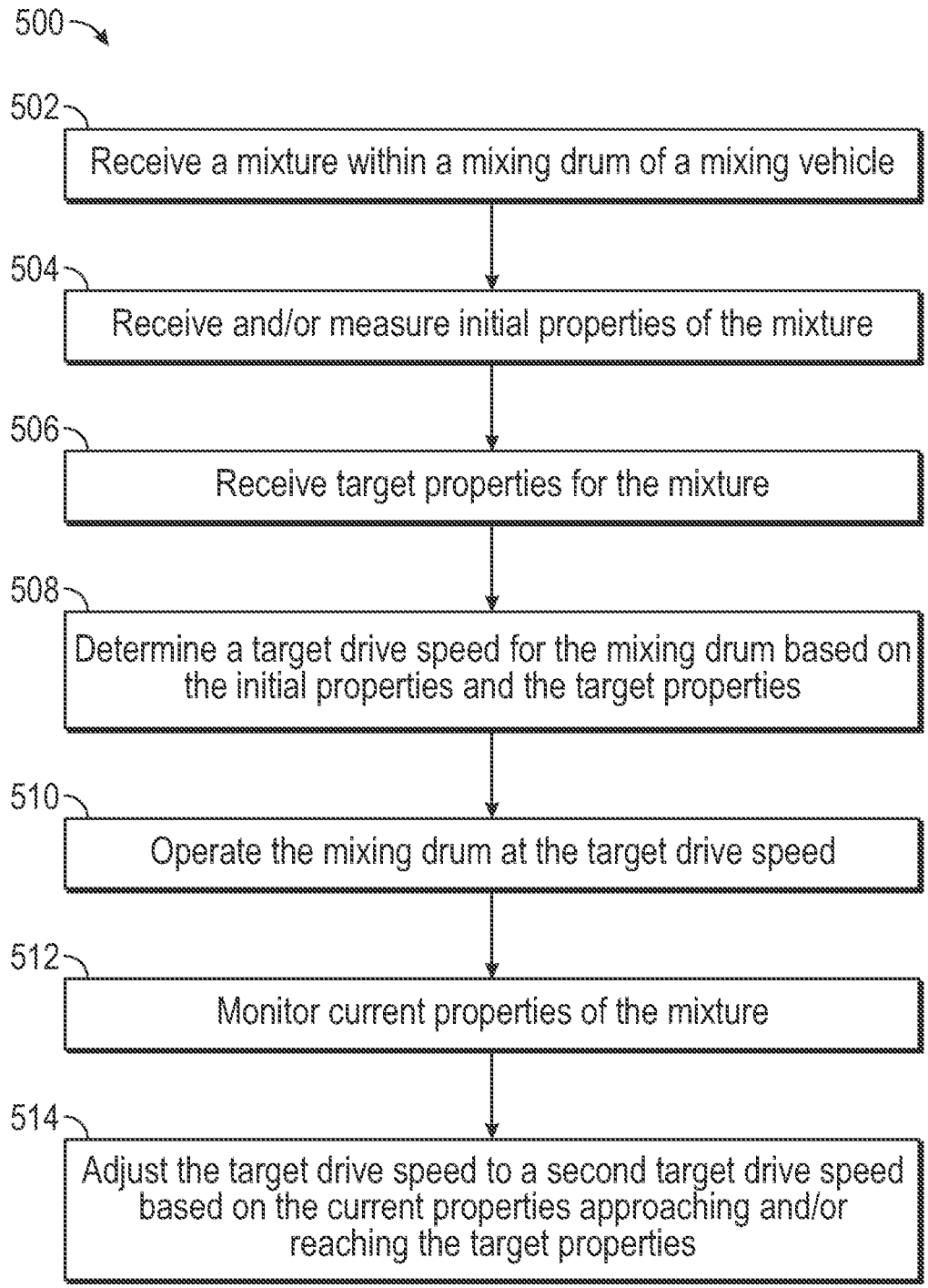
FIG. 5 is a method for controlling a drum drive system of a concrete mixing truck, according to an exemplary embodiment.

Referring now to FIG. 5, a method 500 for controlling a drum drive system of a concrete mixing truck is shown, according to an exemplary embodiment. At step 502, a mixing drum (e.g., the mixing drum 102, etc.) of a mixing vehicle (e.g., the concrete mixing truck 10, etc.) receives a mixture (e.g., a wet concrete mixture, etc.). At step 504, a controller (e.g., the drum assembly controller 160, the remote monitoring and/or command system 192, etc.) is configured to receive initial properties of the mixture (e.g., from an operator with the user interface 188, etc.) and/or receive measured initial properties of the mixture from a sensor (e.g., the sensor 140, etc.). At step 506, the controller is configured to receive target properties for the mixture (e.g., from an operator with the user interface 188, etc.). In some embodiments, the controller is configured to receive a signal from a batching system at a concrete plant. The signal may contain data indicating that loading of the mixing drum of the mixing vehicle has started and/or is about to start. The controller may be configured to initiate rotation of the mixing drum and/or set the speed of the drum to a desired speed based on the signal from the batching system and/or the target properties. In some embodiments, the controller is configured to rotate the mixing drum based on a GPS location of the mixing truck (e.g., to verify that the mixing truck is at the concrete plant and thereafter rotate the mixing drum, etc.). In other embodiments, the controller is configured to additionally or alternatively rotate the mixing drum based on a sensor input from the sensor indicating that loading has initiated. In still other embodiments, the controller is configured to rotate the mixing drum based on a user input indicating that loading has started and/or is about to start (e.g., using the user interface 188, etc.).

At step 508, the controller is configured to determine a target drive speed for the mixing drum based on the initial properties and the target properties of the mixture. In other embodiments, the target speed is predetermined and sent to the controller from the batching system at the concrete plant. At step 510, the controller is configured to operate the mixing drum (e.g., with the drum drive system 120, etc.) at the target drive speed. At step 512, the controller is configured to monitor the current properties of the mixture using the sensor. In some embodiments, the controller is additionally or alternatively configured to estimate the current properties of the mixture (e.g., in embodiments where the concrete mixing truck 10 does not include a mixture sensor, the mixture data may be determined using a prediction algorithm based on the initial properties, various adjustments performed during transit, the environmental data, and/or the GPS data without measurement thereof with a sensor, etc.). At step 514, the controller is configured to adjust the target drive speed to a second target drive speed based on the current properties approaching and/or reaching the target properties (e.g., to prevent overshoot, etc.). In some embodiments, the controller is additionally or alternatively configured to control an amount of water injected into the mixing drum to supplement or replace adaptively controlling the drive speed of the mixing drum to provide the target properties for the mixture. Such injection may be limited to a threshold amount of water and/or limited based on the GPS location of the mixing truck.

Figure 6:
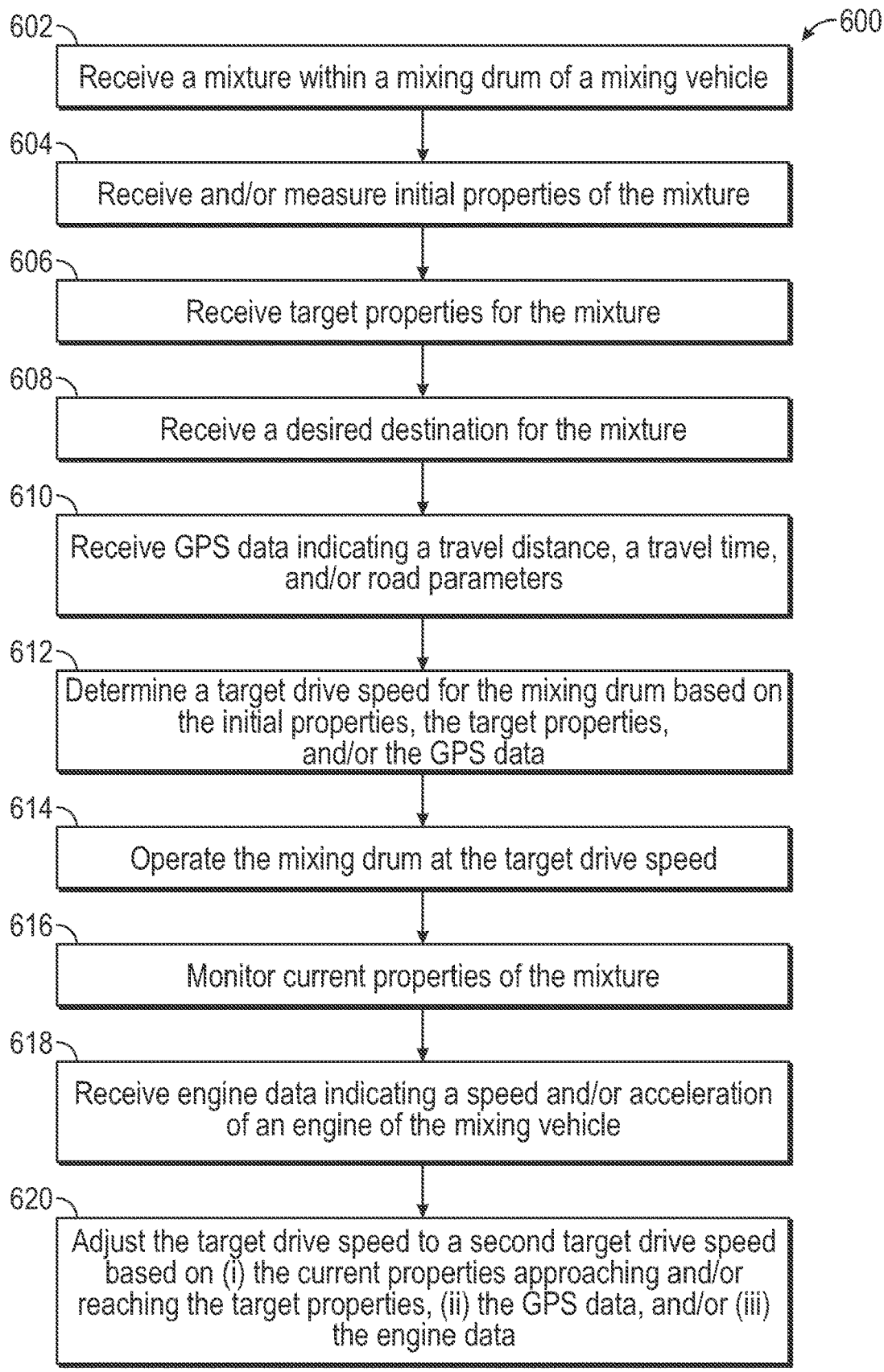
FIG. 6 is a method for controlling a drum drive system of a concrete mixing truck, according to another exemplary embodiment.

Referring now to FIG. 6, a method 600 for controlling a drum drive system of a concrete mixing truck is shown, according to another exemplary embodiment. At step 602, a mixing drum (e.g., the mixing drum 102, etc.) of a mixing vehicle (e.g., the concrete mixing truck 10, etc.) receives a mixture (e.g., a wet concrete mixture, etc.). At step 604, a controller (e.g., the drum assembly controller 160, the remote monitoring and/or command system 192, etc.) is configured to receive initial properties of the mixture (e.g., from an operator with the user interface 188, from a batching system at a concrete plant, etc.) and/or receive measured initial properties of the mixture from a sensor (e.g., the sensor 140, etc.). At step 606, the controller is configured to receive target properties for the mixture (e.g., from an operator with the user interface 188, etc.). In some embodiments, the controller is configured to receive a signal from a batching system at a concrete plant. The signal may contain data indicating that loading of the mixing drum of the mixing vehicle has started and/or is about to start. The controller may be configured to initiate rotation of the mixing drum and/or set the speed of the drum to a desired speed based on the signal from the batching system and/or the target properties. In some embodiments, the controller is configured to rotate the mixing drum based on a GPS location of the mixing truck (e.g., to verify that the mixing truck is at the concrete plant and thereafter rotate the mixing drum, etc.). In other embodiments, the controller is configured to additionally or alternatively rotate the mixing drum based on a sensor input from the sensor indicating that loading has initiated. In still other embodiments, the controller is configured to rotate the mixing drum based on a user input indicating that loading has started and/or is about to start (e.g., using the user interface 188, etc.).

At step 608, the controller is configured to receive a desired destination for the mixture (e.g., from an operator using the user interface 188, etc.). At step 610, the controller is configured to receive GPS data indicating a travel distance, a travel time, traffic information, traffic patterns, and/or road parameters (e.g., from the GPS 190, etc.) between a current location and the desired destination. At step 612, the controller is configured to determine a target drive speed for the mixing drum based on the initial properties for the mixture, the target properties of the mixture, and/or the GPS data. In other embodiments, the target speed is predetermined and sent to the controller from the batching system at the concrete plant. At step 614, the controller is configured to operate the mixing drum (e.g., with the drum drive system 120, etc.) at the target drive speed.

At step 616, the controller is configured to monitor the current properties of the mixture using the sensor. In some embodiments, the controller is additionally or alternatively configured to estimate the current properties of the mixture (e.g., in embodiments where the concrete mixing truck 10 does not include a mixture sensor, the mixture data may be determined using a prediction algorithm based on the initial properties, various adjustments performed during transit, the environmental data, and/or the GPS data without measurement thereof with a sensor, etc.). At step 618, the controller is configured to receive engine data indicating a speed and/or acceleration (or deceleration) of an engine (e.g., the engine 16, etc.) of the mixing vehicle. At step 620, the controller is configured to adjust the target drive speed to a second target drive speed based on (i) the current properties approaching and/or reaching the target properties (e.g., to prevent overshoot, etc.), (ii) the GPS data (e.g., hills, stop signs, stop lights, traffic, etc.), and/or (iii) the engine data (e.g., acceleration, deceleration, etc.). In some embodiments, the controller is additionally or alternatively configured to control an amount of water injected into the mixing drum to supplement or replace adaptively controlling the drive speed of the mixing drum to provide the target properties for the mixture. Such injection may be limited to a threshold amount of water and/or limited based on the GPS location of the mixing truck.

Property Prediction Methods

Figure 7:
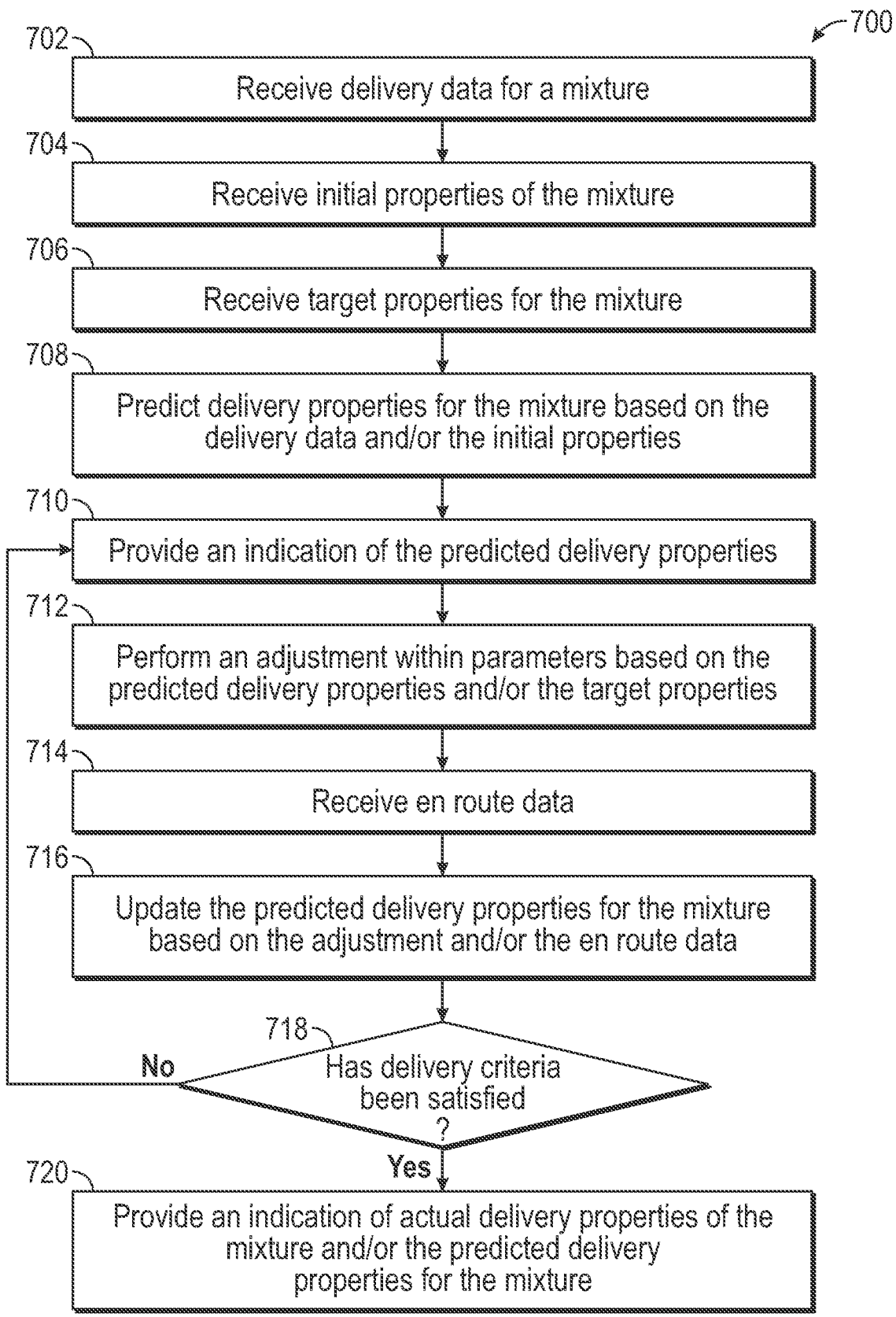
FIG. 7 is a method for predicting properties of a mixture within a concrete mixing truck, according to an exemplary embodiment.

Referring now to FIG. 7, a method 700 for predicting properties of a mixture within a mixing vehicle is shown, according to an exemplary embodiment. Method 700 may begin with a mixing drum (e.g., the mixing drum 102, etc.) of a mixing vehicle (e.g., the concrete mixing truck 10, etc.) receiving a mixture (e.g., a wet concrete mixture from a concrete plant, etc.). In some embodiments, a controller (e.g., the drum assembly controller 160, etc.) is configured to receive a signal from a batching system at a concrete plant indicating that loading of the mixing drum of the mixing vehicle has started. Such a signal may cause the controller to initiate rotation of the mixing drum and/or set the speed of the drum to a desired speed. In some embodiments, such initiation of the rotation of the mixing drum further utilizes a GPS location of the mixing vehicle to verify that the mixing vehicle is at the concrete plant and being loaded when the signal is sent. In other embodiments, the initiation of the rotation is based on a sensor input from a sensor (e.g., the sensor 140, a mixture sensor, etc.) indicating loading has initiated. In still other embodiments, the initiation of the rotation in based on an operator input (e.g., using the user interface 188, etc.).

At step 702, a controller (e.g., the drum assembly controller 160, the remote monitoring and/or command system 192, etc.) is configured to receive delivery data for the mixture. The delivery data may include a delivery time, a delivery location, and/or a delivery route. In some embodiments, the controller receives at least a portion of the delivery data from a user input (e.g., using the user interface 188, etc.). The delivery data may be provided by an operator of the mixing vehicle, an employee at a concrete plant, and/or a customer and transmitted to the controller (e.g., remotely, wirelessly, via a wired connection, onboard the mixing vehicle, etc.). In some embodiments, the controller receives at least a portion of the delivery data from a GPS (e.g., the GPS 190, etc.).

At step 704, the controller is configured to receive initial properties of the mixture. The initial properties of the mixture may include a weight of the mixture, a volume of the mixture, a constituent makeup of the mixture (e.g., amount of cementitious material, aggregate, sand, water content, air entrainers, water reducers, set retarders, set accelerators, superplasticizers, corrosion inhibitors, coloring, calcium chloride, minerals, etc.), an initial slump of the mixture, an initial viscosity of the mixture, and/or any other properties known about the mixture prior to and/or upon entry into the mixing drum. In some embodiments, the controller receives at least a portion of the initial properties from a user input (e.g., using the user interface 188, etc.). The initial properties may be input by an operator of the mixing vehicle and/or an employee at a concrete plant (e.g., remotely, wirelessly, via a wired connection, onboard the mixing vehicle, etc.). In some embodiments, the controller receives at least a portion of the initial properties from a sensor (e.g., a mixture sensor positioned within the mixing drum, the sensor 140, etc.).

According to an exemplary embodiment, the controller is configured to receive environment data. The environment data may be indicative of an environmental characteristic. The environmental characteristics may include an ambient temperature, a relative humidity, wind speed, elevation, precipitation characteristics (e.g., rain, snow, fog, etc.), traffic information/patterns, road attributes, etc. In some embodiments, the controller receives at least a portion of the environment data from a user input (e.g., using the user interface 188, etc.). The environment data may be input by an operator of the mixing vehicle and/or an employee at a concrete plant (e.g., remotely, wirelessly, via a wired connection, onboard the mixing vehicle, etc.). In some embodiments, the controller receives at least a portion of the environment data from a sensor (e.g., a temperature sensor, a barometer or other pressure sensor, a humidity sensor, a pitot tube, an altimeter, an accelerometer, a camera, a proximity sensor, a sensor positioned on the mixing vehicle, the sensor 140, etc.). In some embodiments, the controller receives at least a portion of the environment data from an internet based service (e.g., a weather and/or topography service that is accessed by and/or provided to the controller and based on current location of the mixing vehicle, etc.).

At step 706, the controller is configured to receive target properties for the mixture. The target properties for the mixture may include a consistency, mixture quality, amount of air entrainment, viscosity, slump, temperature, water content, and/or still other properties desired for the mixture. According to an exemplary embodiment, the controller receives the target properties from a user input (e.g., using the user interface 188, etc.). The target properties may be provided by an operator of the mixing vehicle, an employee at a concrete plant, and/or a customer (e.g., remotely, wirelessly, via a wired connection, onboard the mixing vehicle, etc.). In some embodiments, at least a portion of the initial properties and/or target properties are predefined within batching software (e.g., a standard initial property in batching software associated with the concrete plant, a standard target property in batching software associated with the concrete plant, software associated with the memory 166 and/or the concrete property module 174 of the drum assembly controller 160, etc.). In some embodiments, the controller is configured to determine and operate the mixing drum (e.g., with the drum drive system 120, etc.) at an initial drive speed based on the initial properties of the mixture, the delivery data, the environment data, and/or the target properties for the mixture. In other embodiments, the initial drive speed is predetermined and sent to the controller from the batching system at the concrete plant. In some embodiments, the controller is configured to additionally or alternatively determine and operate the mixing drum at the initial drive speed based on a target drum life for the mixing drum (e.g., a number of yards and mix of concrete the mixing drum is designed to receive throughout an operating lifetime thereof, a number of yards of concrete the mixing drum is designed to receive throughout an operating lifetime thereof without regard for the particular mix of the concrete, etc.) and/or a type of the mixing drum (e.g., capacity, shape, manufacturer, a front discharge mixing drum, a rear discharge mixing drum, a thickness of a sidewall or other portion of the mixing drum, type and/or identity of materials the mixing drum is manufactured from, dimensional characteristics, etc.).

At step 708, the controller is configured to predict delivery properties for the mixture (i.e., predicted properties for the mixture upon arrival at the destination) based on the delivery data, the initial properties of the mixture, and/or the environmental data. In some embodiments, the controller is configured to additionally or alternatively predict the delivery properties for the mixture based on a target drum life for the mixing drum, a target life of one or more mixing drum components, a current state of the mixing drum (e.g., relative to the target drum life for the mixing drum, etc.), a current state of one or more mixing drum components (e.g., relative to the target life for the one or more mixing drum components, etc.), and/or the type of the mixing drum. At step 710, the controller is configured to provide an indication of the predicted delivery properties for the mixture. The predicted delivery properties may include a consistency, mixture quality, amount of air entrainment, viscosity, slump, temperature, water content, and/or still other properties predicted for the mixture upon arrival at the destination (e.g., a job site, etc.). In some embodiments, the indication of the predicted delivery properties for the mixture is provided to an operator of the mixing vehicle (e.g., on the user interface 188 within the cab 14, etc.). In some embodiments, the indication of the predicted delivery properties for the mixture is provided to the batching system at the concrete plant (e.g., on a plant computer, etc.). In some embodiments, the indication of the predicted delivery properties for the mixture is provided to a customer (e.g., on a customer device, etc.).

At step 712, the controller is configured to provide an adjustment within predefined parameters based on the predicted delivery properties, the target properties, a target drum life for the mixing drum, a target life of one or more mixing drum components, a current state of the mixing drum (e.g., relative to the target drum life for the mixing drum, etc.), a current state of one or more mixing drum components (e.g., relative to the target life for the one or more mixing drum components, etc.), and/or the type of the mixing drum. In some embodiments, the adjustment includes adaptively controlling a speed at which a drive system (e.g., the drum drive system 120, etc.) rotates the mixing drum (e.g., from a first speed to a second, different speed, etc.). Such control of the rotational speed of the mixing drum may alter the properties of the mixture (e.g., to achieve the target properties for the mixture, etc.). By way of example, increasing the speed of mixing drum may increase the temperature of the mixture to (e.g., reducing the water content thereof, etc.), and decrease the slump while increasing the viscosity of the mixture at an increased rate (e.g., relative to a lower rotational speed, etc.). By way of another example, a reduced speed of the mixing drum may provide a constant or decreased temperature of the mixture and (i) maintain the slump and viscosity of the mixture or (ii) decrease the slump while increasing the viscosity at a reduced rate (e.g., relative to a higher rotational speed, etc.).

In some embodiments, the adjustment additionally or alternatively includes adaptively controlling an amount of water and/or chemicals injected from a reservoir into the mixing drum by an injection valve (e.g., the injection valve of the injection port 130, etc.). Such injection of water and/or chemicals may be used to supplement and/or replace adaptively controlling the speed of the mixing drum to provide the target properties for the mixture. Such injection may be limited to a threshold amount of water and/or chemicals, and/or limited based on GPS location of the mixing vehicle. By way of example, the controller may be configured to prevent an operator of the mixing vehicle and/or the control scheme from introducing more than a predetermined, threshold amount of water and/or chemicals into the mixture (e.g., indicated by a batching system at a concrete plant, indicated by the target properties, indicated by a customer, etc.) to inhibit saturating the mixture with liquid. By way of another example, the controller may be configured to prevent an operator of the mixing vehicle and/or the control scheme from introducing water and/or chemicals to the mixture based on the GPS location of the mixing vehicle. For example, the controller may selectively prevent the injection of water and/or chemicals after the mixing vehicle arrives at a job site.

At step 714, the controller is configured to receive en route data. The en route data may include the environment data (e.g., updated environment data, an environmental characteristic such as an ambient temperature, a relative humidity, wind speed, elevation, precipitation characteristics, traffic information/patterns, road attributes, etc.), mixture data, and/or GPS data. The controller may receive the mixture data from a sensor (e.g., a mixture sensor, the sensor 140, etc.) positioned within the mixing drum and/or estimate the mixture data. The mixture data may be indicative of one or more current properties of the mixture within the mixing drum. The controller may receive the GPS data from the GPS. The GPS data may include turn-by-turn driving instructions, travel distance, and/or travel time from a current location of the mixing vehicle to the destination. The GPS data may additionally or alternatively provide information regarding traffic information and/or traffic patterns at and/or ahead of the mixing vehicle. At step 716, the controller is configured to update the predicted delivery properties based on the adjustment performed and/or the en route data (e.g., the environment data, the mixture data, the GPS data, etc.).

At step 718, the controller is configured to determine whether delivery criteria has been satisfied (e.g., the delivery time has been reached, the mixing vehicle has arrived at the delivery location for the mixture, etc.). If the delivery criteria has not been satisfied, the controller is configured to repeat steps 710-716. Thus, the controller may be configured to continuously and/or periodically (e.g., every minute, two minutes, five minutes, ten minutes, etc.; every mile, two miles, five miles, ten miles, etc.) (i) provide indications of the predicted delivery properties, (ii) make adjustments based on the predicted delivery properties and/or the target properties, (iii) receive the en route data (e.g., the environment data, the mixture data, the GPS data, etc.), and (iv) update the predicted delivery properties based on the adjustments and/or the en route data.

If the delivery criteria has been satisfied, the controller is configured to provide an indication of the actual delivery properties of the mixture and/or the predicted delivery properties for the mixture. In some embodiments, the indication of the actual properties of the mixture is provided to an operator of the mixing vehicle (e.g., on the user interface 188 within the cab 14, etc.). In some embodiments, the indication of the actual delivery properties of the mixture is provided to a concrete plant (e.g., on a plant computer, the batching system etc.). In some embodiments, the indication of the actual delivery properties of the mixture is provided to a customer (e.g., on a customer device, etc.). The actual delivery properties may be acquired and transmitted to the controller by the sensor within the mixing drum and/or manually determined and entered into the user interface by the operator and/or a quality personnel. The actual delivery properties of the mixture and the predicted delivery properties for the mixture may be compared and used for further processing.

Figure 8:
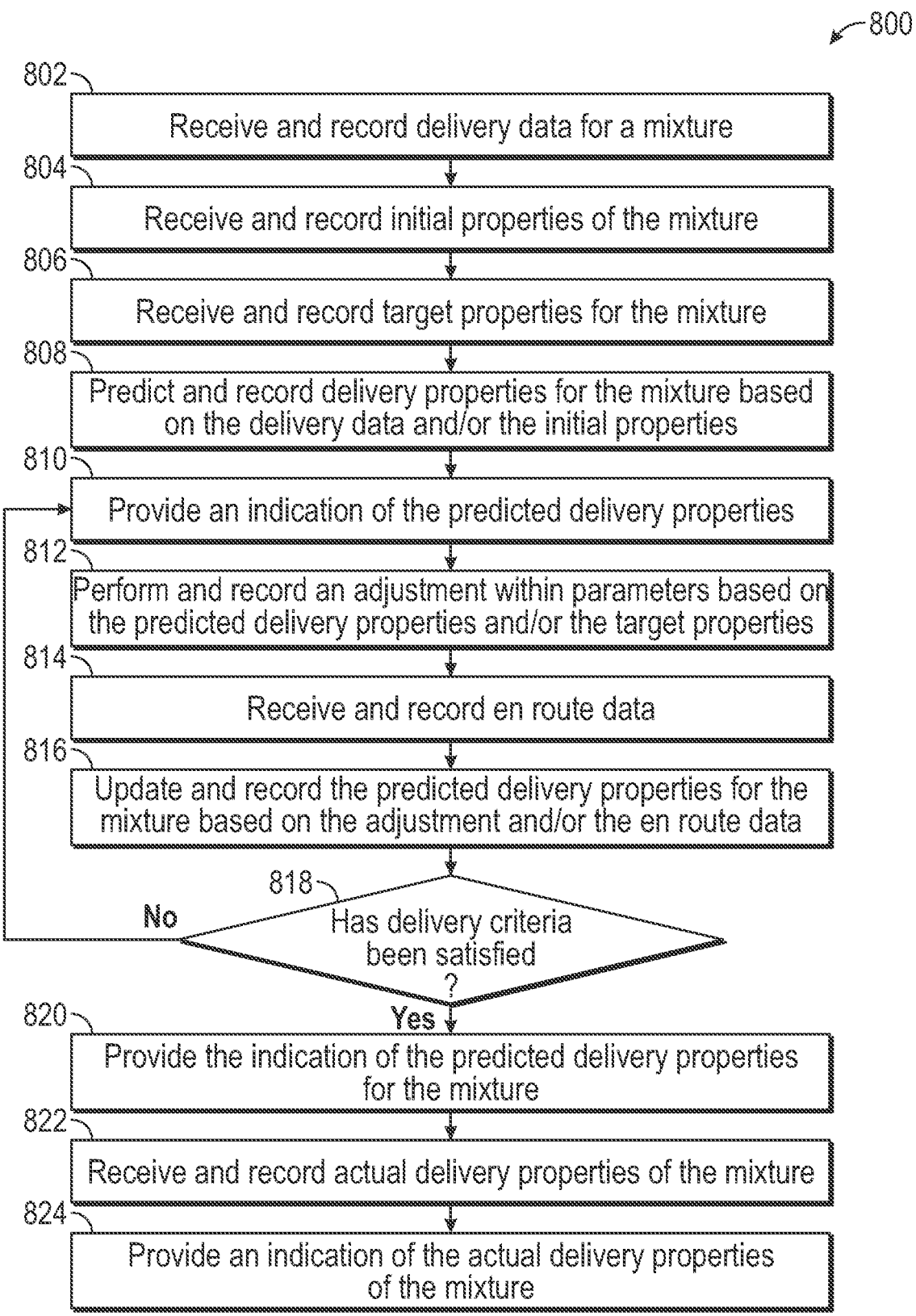
FIG. 8 is a method for predicting properties of a mixture within a concrete mixing truck, according to another exemplary embodiment.

Referring now to FIG. 8, a method 800 for predicting properties of a mixture within a mixing vehicle is shown, according to another exemplary embodiment. Method 800 may begin with a mixing drum (e.g., the mixing drum 102, etc.) of a mixing vehicle (e.g., the concrete mixing truck 10, etc.) receiving a mixture (e.g., a wet concrete mixture from a concrete plant, etc.). In some embodiments, a controller (e.g., the drum assembly controller 160, etc.) is configured to receive a signal from a batching system at a concrete plant indicating that loading of the mixing drum of the mixing vehicle has started. Such a signal may cause the controller to initiate rotation of the mixing drum and/or set the speed of the drum to a desired speed. In some embodiments, such initiation of the rotation of the mixing drum further utilizes a GPS location of the mixing vehicle to verify that the mixing vehicle is at the concrete plant and being loaded when the signal is sent. In other embodiments, the initiation of the rotation is based on a sensor input from a sensor (e.g., the sensor 140, a mixture sensor, etc.) indicating loading has initiated. In still other embodiments, the initiation of the rotation in based on an operator input (e.g., using the user interface 188, etc.).

At step 802, a controller (e.g., the drum assembly controller 160, the remote monitoring and/or command system 192, etc.) is configured to receive and record delivery data for the mixture. The delivery data may include a delivery time, a delivery location, and/or a delivery route. In some embodiments, the controller receives at least a portion of the delivery data from a user input (e.g., using the user interface 188, etc.). The delivery data may be provided by an operator of the mixing vehicle, an employee at a concrete plant, and/or a customer and transmitted to the controller (e.g., remotely, wirelessly, via a wired connection, onboard the mixing vehicle, etc.). In some embodiments, the controller receives at least a portion of the delivery data from a GPS (e.g., the GPS 190, etc.).

At step 804, the controller is configured to receive and record initial properties of the mixture. The initial properties of the mixture may include a weight of the mixture, a volume of the mixture, a constituent makeup of the mixture (e.g., amount of cementitious material, aggregate, sand, water content, air entrainers, water reducers, set retarders, set accelerators, superplasticizers, corrosion inhibitors, coloring, calcium chloride, minerals, etc.), an initial slump of the mixture, an initial viscosity of the mixture, and/or any other properties known about the mixture prior to and/or upon entry into the mixing drum. In some embodiments, the controller receives at least a portion of the initial properties from a user input (e.g., using the user interface 188, etc.). The initial properties may be input by an operator of the mixing vehicle and/or an employee at a concrete plant (e.g., remotely, wirelessly, via a wired connection, onboard the mixing vehicle, etc.). In some embodiments, the controller receives at least a portion of the initial properties from a sensor (e.g., a mixture sensor positioned within the mixing drum, the sensor 140, etc.).

According to an exemplary embodiment, the controller is configured to receive and record environment data. The environment data may be indicative of an environmental characteristic. The environmental characteristics may include an ambient temperature, a relative humidity, wind speed, elevation, precipitation characteristics (e.g., rain, snow, fog, etc.), traffic information/patterns, road attributes, etc. In some embodiments, the controller receives at least a portion of the environment data from a user input (e.g., using the user interface 188, etc.). The environment data may be input by an operator of the mixing vehicle and/or an employee at a concrete plant (e.g., remotely, wirelessly, via a wired connection, onboard the mixing vehicle, etc.). In some embodiments, the controller receives at least a portion of the environment data from a sensor (e.g., a temperature sensor, a barometer or other pressure sensor, a humidity sensor, a pitot tube, an altimeter, a sensor positioned on the mixing vehicle, the sensor 140, etc.). In some embodiments, the controller receives at least a portion of the environment data from an internet based service (e.g., a weather and/or topography service that is accessed by and/or provided to the controller and based on current location of the mixing vehicle, etc.).

At step 806, the controller is configured to receive and record target properties for the mixture. The target properties for the mixture may include a consistency, mixture quality, amount of air entrainment, viscosity, slump, temperature, water content, and/or still other properties desired for the mixture. According to an exemplary embodiment, the controller receives the target properties from a user input (e.g., using the user interface 188, etc.). The target properties may be provided by an operator of the mixing vehicle, an employee at a concrete plant, and/or a customer (e.g., remotely, wirelessly, via a wired connection, onboard the mixing vehicle, etc.). In some embodiments, at least a portion of the target properties are predefined within batching software (e.g., a standard initial property in batching software associated with the concrete plant, a standard target property in batching software associated with the concrete plant, software associated with the memory 166 and/or the concrete property module 174 of the drum assembly controller 160, etc.). In some embodiments, the controller is configured to determine and operate the mixing drum (e.g., with the drum drive system 120, etc.) at an initial drive speed based on the initial properties of the mixture, the delivery data, the environment data, and/or the target properties for the mixture. In other embodiments, the initial drive speed is predetermined and sent to the controller from the batching system at the concrete plant. In some embodiments, the controller is configured to additionally or alternatively determine and operate the mixing drum at the initial drive speed based on a target drum life for the mixing drum (e.g., a number of yards and mix of concrete the mixing drum is designed to receive throughout an operating lifetime thereof, a number of yards of concrete the mixing drum is designed to receive throughout an operating lifetime thereof without regard for the particular mix of the concrete, etc.) and/or a type of the mixing drum (e.g., capacity, shape, manufacturer, a front discharge mixing drum, a rear discharge mixing drum, a thickness of a sidewall or other portion of the mixing drum, type and/or identity of materials the mixing drum is manufactured from, dimensional characteristics, etc.).

At step 808, the controller is configured to predict and record delivery properties for the mixture (i.e., predicted properties for the mixture upon arrival at the destination) based on the delivery data, the initial properties of the mixture, and/or the environmental data. In some embodiments, the controller is configured to additionally or alternatively predict the delivery properties for the mixture based on a target drum life for the mixing drum, a target life of one or more mixing drum components, a current state of the mixing drum (e.g., relative to the target drum life for the mixing drum, etc.), a current state of one or more mixing drum components (e.g., relative to the target life for the one or more mixing drum components, etc.), and/or the type of the mixing drum. At step 810, the controller is configured to provide an indication of the predicted delivery properties for the mixture. The predicted delivery properties may include a consistency, mixture quality, amount of air entrainment, viscosity, slump, temperature, water content, and/or still other properties predicted for the mixture upon arrival at the destination (e.g., a job site, etc.). In some embodiments, the indication of the predicted delivery properties for the mixture is provided to an operator of the mixing vehicle (e.g., on the user interface 188 within the cab 14, etc.). In some embodiments, the indication of the predicted delivery properties for the mixture is provided to a concrete plant (e.g., on a plant computer, the batching system etc.). In some embodiments, the indication of the predicted delivery properties for the mixture is provided to a customer (e.g., on a customer device, etc.).

At step 812, the controller is configured to provide and record an adjustment within predefined parameters based on the predicted delivery properties, the target properties, a target drum life for the mixing drum, a target life of one or more mixing drum components, a current state of the mixing drum (e.g., relative to the target drum life for the mixing drum, etc.), a current state of one or more mixing drum components (e.g., relative to the target life for the one or more mixing drum components, etc.), and/or the type of the mixing drum. In some embodiments, the adjustment includes adaptively controlling a speed at which a drive system (e.g., the drum drive system 120, etc.) rotates the mixing drum (e.g., from a first speed to a second, different speed, etc.). Such control of the rotational speed of the mixing drum may alter the properties of the mixture (e.g., to achieve the target properties for the mixture, etc.). By way of example, increasing the speed of mixing drum may increase the temperature of the mixture (e.g., reducing the water content thereof, etc.), and decrease the slump while increasing the viscosity of the mixture at an increased rate (e.g., relative to a lower rotational speed, etc.). By way of another example, a reduced speed of the mixing drum may provide a constant or decreased temperature of the mixture and (i) maintain the slump and viscosity of the mixture or (ii) decrease the slump while increasing the viscosity at a reduced rate (e.g., relative to a higher rotational speed, etc.).

In some embodiments, the adjustment additionally or alternatively includes adaptively controlling an amount of water and/or chemicals injected from a reservoir into the mixing drum by an injection valve (e.g., the injection valve of the injection port 130, etc.). Such injection of water and/or chemicals may be used to supplement and/or replace adaptively controlling the speed of the mixing drum to provide the target properties for the mixture. Such injection may be limited to a threshold amount of water and/or chemicals, and/or limited based on GPS location of the mixing vehicle. By way of example, the controller may be configured to prevent an operator of the mixing vehicle and/or the control scheme from introducing more than a predetermined, threshold amount of water and/or chemicals into the mixture (e.g., indicated by a batching system at a concrete plant, indicated by the target properties, indicated by a customer, etc.) to inhibit saturating the mixture with liquid. By way of another example, the controller may be configured to prevent an operator of the mixing vehicle and/or the control scheme from introducing water and/or chemicals to the mixture based on the GPS location of the mixing vehicle. For example, the controller may selectively prevent the injection of water and/or chemicals after the mixing vehicle arrives at a job site.

At step 814, the controller is configured to receive and record en route data. The en route data may include the environment data (e.g., updated environment data, an environmental characteristic such as an ambient temperature, a relative humidity, wind speed, elevation, precipitation characteristics, traffic information/patterns, road attributes, etc.), mixture data, and/or GPS data. The controller may receive the mixture data from a sensor (e.g., a mixture sensor, the sensor 140, etc.) positioned within the mixing drum and/or estimate the mixture data. The mixture data may be indicative of one or more current properties of the mixture within the mixing drum. The controller may receive the GPS data from the GPS. The GPS data may include turn-by-turn driving instructions, travel distance, and/or travel time from a current location of the mixing vehicle to the destination. The GPS data may additionally or alternatively provide information regarding traffic information and/or traffic patterns at and/or ahead of the mixing vehicle. At step 816, the controller is configured to update and record the predicted delivery properties based on the adjustment performed and/or the en route data (e.g., the environment data, the mixture data, the GPS data, etc.).

At step 818, the controller is configured to determine whether delivery criteria has been satisfied (e.g., the delivery time has been reached, the mixing vehicle has arrived at the delivery location for the mixture, etc.). If the delivery criteria has not been satisfied, the controller is configured to repeat steps 810-816. Thus, the controller may be configured to continuously and/or periodically (e.g., every minute, two minutes, five minutes, ten minutes, etc.; every mile, two miles, five miles, ten miles, etc.) (i) provide indications of the predicted delivery properties, (ii) make and record adjustments based on the predicted delivery properties and/or the target properties, (iii) receive and record the en route data (e.g., the environment data, the mixture data, the GPS data, etc.), and (iv) update and record the predicted delivery properties based on the adjustments and/or the en route data. If the delivery criteria has been satisfied, the controller is configured to provide the indication of the predicted delivery properties for the mixture (step 820).

At step 822, the controller is configured to receive and record actual delivery properties of the mixture. In some embodiments, the controller receives at least a portion of the actual delivery properties from a user input (e.g., using the user interface 188, manually determined and entered, etc.). The actual properties may be provided by an operator of the mixing vehicle, a quality personnel, and/or a customer (e.g., remotely, wirelessly, via a wired connection, onboard the mixing vehicle, etc.). In some embodiments, the controller receives at least a portion of the actual properties from a sensor (e.g., a mixture sensor positioned within the mixing drum, the sensor 140, etc.). At step 824, the controller is configured to provide an indication of the actual delivery properties of the mixture. In some embodiments, the indication of the actual properties of the mixture is provided to an operator of the mixing vehicle (e.g., on the user interface 188 within the cab 14, etc.). In some embodiments, the indication of the actual delivery properties of the mixture is provided to a concrete plant (e.g., on a plant computer, a batching system, etc.). In some embodiments, the indication of the actual delivery properties of the mixture is provided to a customer (e.g., on a customer device, etc.).

According to an exemplary embodiment, the controller is configured to record the delivery data, the initial properties, the target properties, the predicted delivery properties, the adjustments, the en route data (e.g., the environment data, the mixture data, the GPS data, etc.), and/or the actual delivery data to facilitate generating and/or updating a prediction algorithm stored within and operated by the controller. Such generation and/or updating of the prediction algorithm may facilitate providing more accurate prediction and/or control of a mixture's properties in future deliveries. Additionally, once a sufficient amount of data has been compiled, the prediction algorithm may facilitate the removal of the mixture sensor from the mixing vehicle. By way of example, the initial properties of the mixture may be input by the batching system at the plant, determined with sensors at the plant, and/or determined using look-up tables (e.g., based on the compiled data, etc.). The predicted delivery properties and/or the mixture data may be determined based on the initial properties, various adjustments made during transit, the environmental data, and/or the GPS data (e.g., using the compiled data, look-up tables, etc.) without needing to be directly measured with a sensor. Such removal of the mixture sensor may thereby reduce the cost to manufacture and operate the mixing vehicle.

Figure 9:
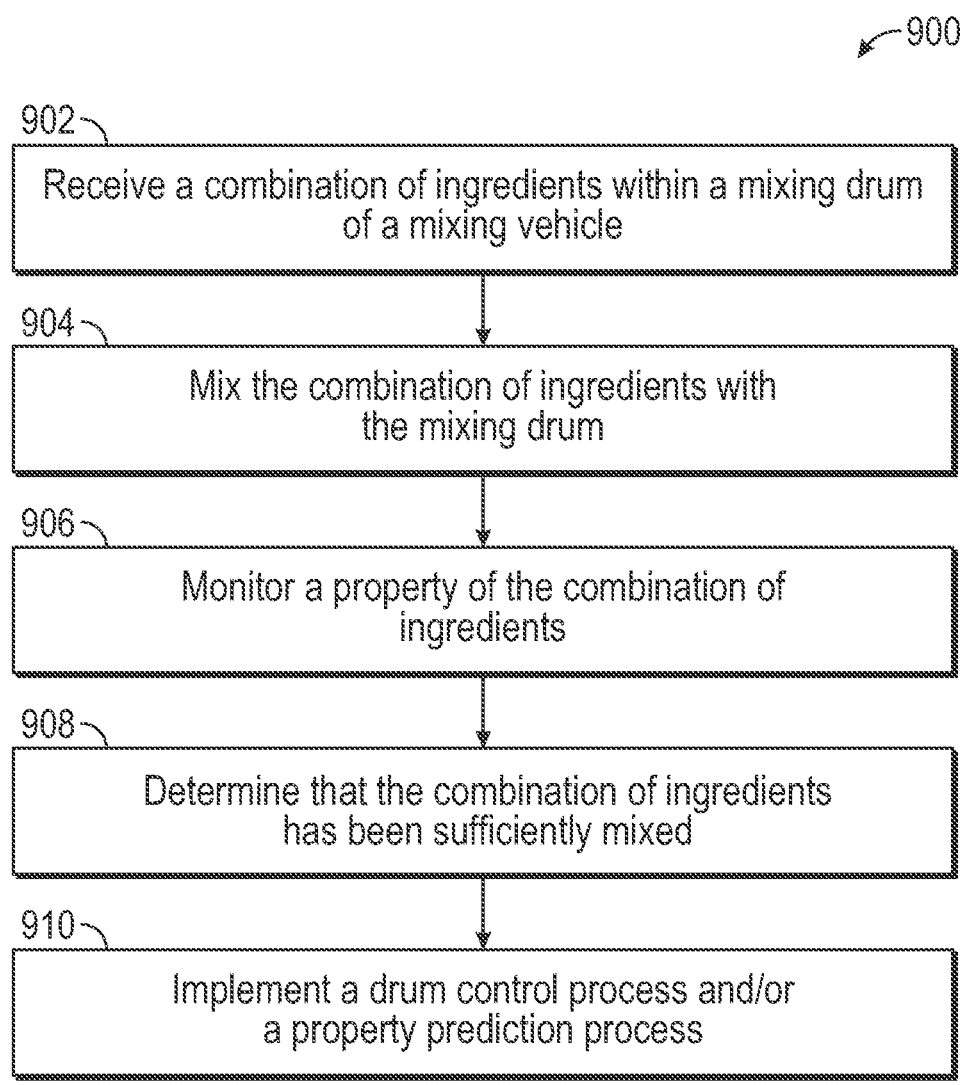
FIG. 9 is a method for determining a combination of ingredients is sufficiently mixed, according to an exemplary embodiment.

Referring now to FIG. 9, a method 900 for determining a combination of ingredients is sufficiently mixed is shown, according to another exemplary embodiment. At step 902, a mixing drum (e.g., the mixing drum 102, etc.) of a mixing vehicle (e.g., the concrete mixing truck 10, etc.) receives a combination of ingredients (e.g., a non-wet mixture, a non-mixed combination of ingredients, etc.). By way of example, the combination of ingredients may include various unmixed constituents when deposited into the mixing drum (e.g., cementitious materials, aggregate, sand, rocks, water, additives, absorbent materials, etc.). At step 904, a controller (e.g., the drum assembly controller 160, the remote monitoring and/or command system 192, etc.) is configured to provide a command to a drive system (e.g., the drum drive system 120, etc.) to mix the combination of ingredients within the mixing drum. At step 906, the controller is configured to estimate and/or monitor a property of the combination of ingredients (e.g., a slump, a consistency, a homogeneity, a moisture content, etc.; with a sensor; using a model, algorithm, look up table, etc.; etc.). At step 908, the controller is configured to determine the combination of ingredients has been sufficiently mixed (e.g., based on the property, the combination of ingredients has been combined to form a wet concrete mixture, etc.). At step 910, the controller is configured to implement a drum control process (e.g., method 500, method 600, etc.) and/or a property prediction process (e.g., method 700, method 800, etc.).

Command Control and Monitoring System

According to the exemplary embodiment shown in FIGS. 10-13, the concrete mixing truck 10 includes a command control and monitoring system including the sensors 140, the drum control system 150, and the user interface 188. The command control and monitoring system is configured to facilitate an operator in providing commands to various components of the concrete mixing truck 10 (e.g., the engine 16, the drum drive system 120, the sensors 140, the user interface 188, etc.), according to an exemplary embodiment. The command control and monitoring system is additionally or alternatively configured to facilitate an operator in monitoring various components of the concrete mixing truck 10 based on diagnostic information regarding the various components, according to an exemplary embodiment.

Figure 11:
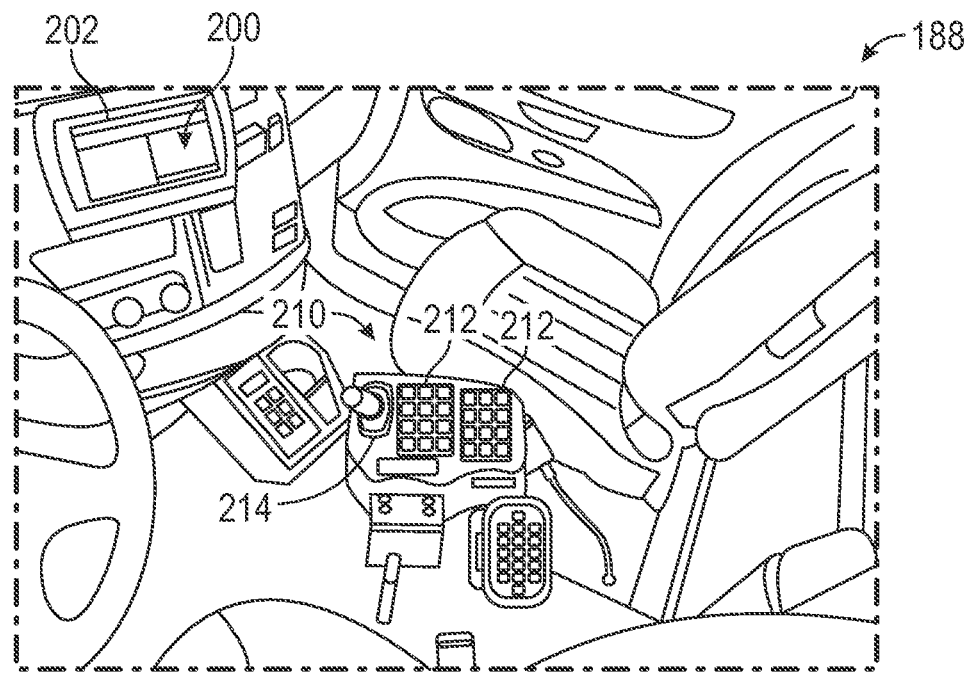
FIG. 11 is a perspective view of a user interface of the concrete mixing truck of FIG. 1, according to an exemplary embodiment.

As shown in FIGS. 10 and 11, the user interface 188 includes a first interface, shown as display device 200, a second interface, shown as cab input device 210, and a third interface, shown as rear input device 220. As shown in FIG. 10, the display device 200 and the cab input device 210 are positioned within the cab 14, and the rear input device 220 is positioned external from the cab 14 at the rear of the drum assembly 100. In other embodiments, the rear input device 220 is otherwise positioned about the exterior of the concrete mixing truck 10.

As shown in FIG. 11, the display device 200 includes a screen, shown as display screen 202. According to an exemplary embodiment, the display screen 202 of the display device 200 is configured as a touchscreen display (e.g., a tablet, a touchscreen monitor, etc.). The display device 200 may be configured to display diagnostic information regarding the operational functionality and/or state of various components of the concrete mixing truck 10 (e.g., faults, etc.), operating data regarding current operating parameters of various component of the concrete mixing truck 10, indicia, graphical user interfaces ("GUIs"), and/or still other information to an operator within the cab 14 of the concrete mixing truck 10. The display device 200 may be configured to facilitate providing commands to one or more components of the concrete mixing truck 10 (e.g., the drum drive system 120, the sensors 140, the drum control system 150, etc.) from within the cab 14 of the concrete mixing truck 10.

As shown in FIG. 11, the cab input device 210 includes a command interface, shown as cab control pad 212, having various buttons and an input, shown as joystick 214. According to an exemplary embodiment, the various buttons of the cab control pad 212 facilitate selecting one or more components to control with the joystick 214, selecting a mode of operation of the drum assembly 100, and/or activing/deactivating various components of the concrete mixing truck 10 from within the cab 14. By way of example, the cab control pad 212 and/or the joystick 214 may facilitate controlling a rotational direction of the mixing drum 102, controlling a speed of the mixing drum 102, controlling an angle of the chute 112, controlling an injection of fluid (e.g., water, chemical additives, etc.) into the mixing drum 102, stopping the rotation of the mixing drum 102, starting the rotation of the mixing drum 102, locking and unlocking one or more components of the drum assembly 100, raising and lowering an additional axle of the concrete mixing truck 10 (e.g., for increased loading conditions, etc.), discharging the mixture from the mixing drum 102, and/or otherwise controlling one or more components of the concrete mixing truck 10 from within the cab 14.

According to an exemplary embodiment, the rear input device 220 includes a second control pad or rear control pad having various buttons (e.g., similar to the cab control pad 212 of the cab input device 210, etc.). The various buttons of the second control pad of the rear input device 220 may facilitate selecting one or more components to control (e.g., with the joystick 214, with the rear input device 220, etc.), selecting a mode of operation of the drum assembly 100, and/or activing/deactivating various components of the concrete mixing truck 10 from outside of the concrete mixing truck 10.

Figure 12:
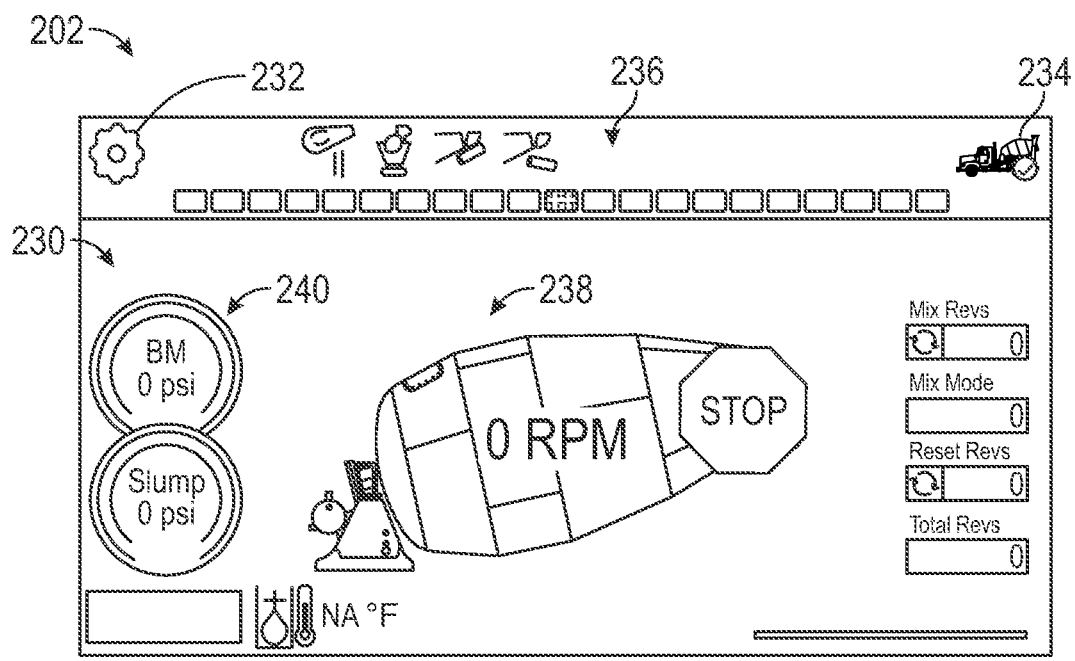
FIG. 12 is a schematic view of a first graphical user interface of the user interface of FIG. 11, according to an exemplary embodiment.

As shown in FIG. 12, the display screen 202 of the display device 200 is configured to display a first graphical user interface, shown as status GUI 230. The status GUI 230 includes various features such as a settings button 232, a mode button 234, a command bar 236, a drum status indicator 238, and a mixture status indicator 240. The setting button 232 may facilitate adjusting the information displayed on the status GUI 230 and/or adjusting the settings of the display device 200 (e.g., a brightness, etc.). The mode button 234 may indicate a current mode the drum assembly 100 is operating in and/or facilitate changing the current mode. The command bar 236 may indicate the current commands that are being provided to the drum assembly 100. The drum status indicator 238 may indicate the speed of the mixing drum 102 and/or the direction of rotation of the mixing drum 102. The mixture status indicator 240 may display the mixture data and indicate one or more properties of the mixture within the mixing drum 102. By way of example, the one or more properties of the mixture may include a mixture quality, a slump, a consistency of mixture, a viscosity, a temperature, an amount of air entrainment, an amount of water content, a weight, a volume, a rotational velocity, a rotational acceleration, a surface tension, etc. of the mixture.

Figure 13:
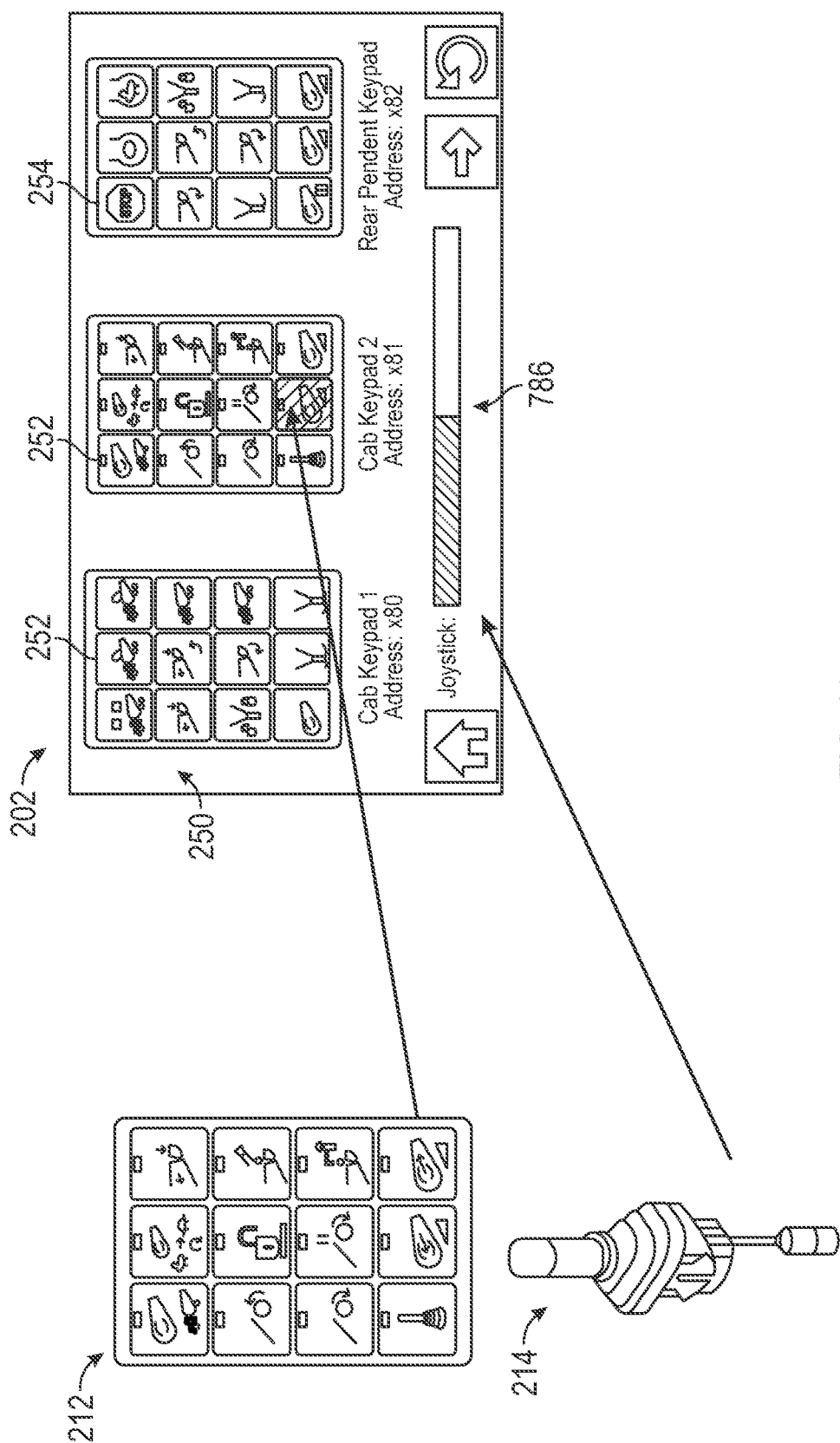
FIG. 13 is a schematic view of a second graphical user interface of the user interface of FIG. 11, according to an exemplary embodiment.

As shown in FIG. 13, the display screen 202 of the display device 200 is configured to display a second graphical user interface, shown as command GUI 250. The command GUI 250 includes a first section, shown as first keypad section 252, a second section, shown as second keypad section 254, and a third section, shown as joystick section 256. According to an exemplary embodiment, the first keypad section 252 is associated with the cab control pad 212 of the cab input device 210, the second keypad section 254 is associated with the rear control pad of the rear input device 220, and the joystick section 256 is associated with the joystick 214. By way of example, when a button is pressed on the cab control pad 212 of the cab input device 210, the associated button in the first keypad section 252 of the command GUI 250 may illuminate, change color, become highlighted, and/or otherwise change to indicate that the associated button has been pressed on the cab control pad 212. By way of another example, when a button is pressed on the rear control pad of the rear input device 220, the associated button in the second keypad section 254 of the command GUI 250 may illuminate, change color, become highlighted, and/or otherwise change to indicate that the associated button has been pressed on the rear input device 220. By way of yet another example, a degree of engagement of the joystick 214 may be represented by a sliding indicator bar of the joystick section 256 (e.g., the more the bar is filled the faster the speed of the mixing drum 102 may be, etc.).

In some embodiments, the display device 200 is additionally or alternatively configured to display at least one of a chute diagnostics GUI, a fuse diagnostics GUI, a drum diagnostics GUI, and/or other diagnostics GUIs to indicate the status, mode, and/or faults of various components of the concrete mixing truck 10. The chute diagnostics GUI may be configured to display the status and/or position of the chute 112 (e.g., up, down, angled left, angled right, centered, locked, unlocked, etc.) and information regarding the circuits thereof. The fuse diagnostics GUI may be configured to indicate whether each respective fuse of the concrete mixing truck 10 is either operational or blown. The drum diagnostics GUI may be configured to display any electrical issues with the drum assembly 100 such as shorts, open circuits, improper installation, etc. and/or display the mode, status, and/or operational parameters of components of the drum assembly 100 (e.g., activation of a drum stop solenoid, a drum charge solenoid, a drum discharge solenoid, etc.; a drum speed; a drum direction; etc.).

According to an exemplary embodiment, the command control and monitoring system is configured to facilitate diagnosing faults and identifying the probable location of the faults on concrete mixing truck 10. By way of example, when a fault is diagnosed by the command control and monitoring system, the display device 200 may provide a GUI having a graphical representation of the concrete mixing truck 10 (e.g., similar to that shown in FIG. 10, etc.) indicating the location of the fault on the concrete mixing truck 10 and/or a suggested solution. For example, components experiencing a fault may be displayed in a different color (e.g., red, etc.), flashing, highlighted, circled, and/or otherwise identified. In some embodiments, the faults are telematically sent to a remote server or computer (e.g., a truck hub, a repair shop, an owner's business, etc.).

By way of example, the command control and monitoring system may be configured to monitor (i) the mixture sensors configured to acquire the mixture data for monitoring concrete properties of the mixture, (ii) the drive system sensors configured to acquire the drive system data for monitoring the operating characteristics of the drum drive system 120, (iii) the environment sensors configured to acquire environment data for monitoring environmental characteristics external to the mixing drum 102, and/or (iv) inputs and outputs used to control functions of the concrete mixing truck 10 (e.g., inputs and outputs of the drum drive system 120, the injector device of the injection port 130, the engine 16, etc.). The command control and monitoring system may be further configured to determine that there is a potential fault with one or more of the sensors (e.g., the mixture sensors, the environment sensors, the drive system sensors, etc.), the input, and/or the output. The command control and monitoring system may be further configured to provide a fault notification on the display device 200 indicating the potential fault location.

In some embodiments, the control and monitoring system is configured monitor a property of the mixture within the mixing drum 102 and provide an alert when the property begins to deviate from an expected or predicted value. For example, the control and monitoring system may be configured to determine that a property is changing at an increased rate or too slow of a rate, determine a potential fault location based on the property that is changing, and provide a fault notification that indicates the potential fault location. By way of example, the control and monitoring system may recognize that the slump of the mixture is increasing (e.g., becoming less viscous, more fluid, etc.). The control and monitoring system may therefore provide an alert that the slump is increasing at an alarming rate and provide an indication that the injection valve may have been left open or stuck (e.g., frozen open in the winter, etc.). The control and monitoring system may thereby provide an alert on the display device 200 to check the injection valve to stop the fluid injection and prevent the slump from increasing further from the target slump.

According to an exemplary embodiment, the display device 200 is portable and removable from the cab 14 (e.g., a tablet, a laptop, a smart device, etc.). The display device 200 may therefore be capable of capturing pictures of the failed or fault area/component (e.g., to be sent to a technician, etc.). The display device 200 may additionally or alternatively be capable of being brought to the area of the concrete mixing truck 10 where the fault originated and provide step-by-step instructions on how to diagnose and troubleshoot the problem. The instructions may be visually displayed and/or audibly provided by the display device 200. The display device 200 may be configured to display data sheets, prints, and/or schematics without having to search or request such information to facilitate the diagnosis and/or troubleshooting. The display device 200 may be configured to facilitate automatic ordering of replacement parts/components directly therefrom. Further, the display device 200 may facilitate remote diagnostics from a service/technician center.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A drum control system comprising:
one or more processing circuits having programed instructions to:
control a drum assembly to rotate a drum at a first, unmixed speed to mix drum contents received by the drum, the drum contents including ingredients of a concrete mixture;
acquire drum contents data indicative of a property of the drum contents from a mixture sensor and monitor the property of the drum contents as the drum rotates;
acquire a target property for the drum contents upon delivery;
determine a second, mixed speed based at least partially on the target property; and
control the drum assembly to rotate the drum at the second, mixed speed in response to determining that the property of the drum contents indicates that the ingredients have been sufficiently mixed.

2. The drum control system of claim 1, wherein the one or more processing circuits have programmed instructions to:
continue to monitor the property of the drum contents while being transported to a delivery destination; and
provide a command to the drum assembly to control operation of a component of the drum assembly to affect the property of the drum contents.

3. The drum control system of claim 2, wherein the command includes at least one of (i) a first command to control the speed at which the drum assembly rotates the drum from the second, mixed speed to a third speed or (ii) a second command to control an amount of a fluid provided into the drum.

4. The drum control system of claim 3, wherein the command includes the first command.

5. The drum control system of claim 3, wherein the command includes the second command.

6. The drum control system of claim 3, wherein the command includes the first command and the second command.

7. The drum control system of claim 1, wherein the one or more processing circuits have programmed instructions to acquire the target property from a batching system.

8. The drum control system of claim 1, further comprising an operator interface, wherein the one or more processing circuits have programmed instructions to acquire the target property from the operator interface.

9. The drum control system of claim 1, wherein the one or more processing circuits have programmed instructions to:
acquire at least one of (i) environment data regarding environmental characteristics or (ii) GPS data including information regarding characteristics of a route between a current location of the drum contents and a delivery destination for the drum contents; and
determine the second, mixed speed based on (i) the property at the time of determining that the ingredients have been sufficiently mixed, (ii) the target property, and (iii) the at least one of the environment data or the GPS data in an attempt to arrive at the delivery destination with the drum contents having the target property.

10. The drum control system of claim 9, wherein the one or more processing circuits have programmed instructions to:
acquire the environment data and the GPS data; and
determine the second, mixed speed based on the environment data and the GPS data.

11. A non-transitory computer-readable storage medium having instructions stored thereon that, upon execution by one or more processors, cause the one or more processors to:
control a drum assembly to rotate a drum at a first, unmixed speed to mix drum contents received by the drum, the drum contents including ingredients of a concrete mixture;
acquire drum contents data indicative of a property of the drum contents from a mixture sensor and monitor the property of the drum contents as the drum rotates;
acquire a target property for the drum contents upon delivery;
determine a second, mixed speed based at least partially on the target property; and
control the drum assembly to rotate the drum at the second, mixed speed in response to determining that the property of the drum contents indicates that the ingredients have been sufficiently mixed.

12. The non-transitory computer-readable storage medium of claim 11, wherein the instructions, when executed by the one or more processors, cause the one or more processors to:
continue to monitor the property of the drum contents while being transported to a delivery destination; and
provide a command to the drum assembly to control operation of a component of the drum assembly to affect the property of the drum contents.

13. The non-transitory computer-readable storage medium of claim 12, wherein the command includes at least one of (i) a first command to control the speed at which the drum assembly rotates the drum from the second, mixed speed to a third speed or (ii) a second command to control an amount of a fluid provided into the drum.

14. The non-transitory computer-readable storage medium of claim 11, wherein the instructions, when executed by the one or more processors, cause the one or more processors to acquire the target property from a batching system.

15. The non-transitory computer-readable storage medium of claim 11, wherein the instructions, when executed by the one or more processors, cause the one or more processors to acquire the target property from an operator interface associated with the drum assembly.

16. A drum control system comprising:
one or more processing circuits having programed instructions to:
control a drum assembly to rotate a drum at a first, unmixed speed to mix drum contents received by the drum;
acquire a property of the drum contents as the drum rotates;
acquire a target property for the drum contents; and
control the drum assembly to rotate the drum at a second, mixed speed in response to determining that the property of the drum contents indicates that the drum contents have been sufficiently mixed, wherein the second, mixed speed is at least partially based on the target property.

17. The drum control system of claim 16, wherein the second, mixed speed is selected in an attempt to deliver the drum contents with the target property to a delivery destination.

18. The drum control system of claim 16, wherein the one or more processing circuits have programmed instructions to:
monitor the property of the drum contents while being transported to a delivery destination; and
provide a command to the drum assembly to control operation of a component of the drum assembly to affect the property of the drum contents.

19. The drum control system of claim 18, wherein the command includes at least one of (i) a first command to control the speed at which the drum assembly rotates the drum from the second, mixed speed to a third speed or (ii) a second command to control an amount of a fluid provided into the drum.

20. The drum control system of claim 16, wherein the one or more processing circuits have programmed instructions to:
acquire at least one of (i) environment data regarding environmental characteristics or (ii) GPS data including information regarding characteristics of a route between a current location of the drum contents and a delivery destination for the drum contents; and determine the second, mixed speed based on (i) the property at the time of determining that the drum contents have been sufficiently mixed, (ii) the target property, and (iii) the at least one of the environment data or the GPS data in an attempt to arrive at the delivery destination with the drum contents having the target property.

* * * * *